US010306269B2

(12) United States Patent
Hendry et al.

(10) Patent No.: US 10,306,269 B2
(45) Date of Patent: May 28, 2019

(54) OPERATION POINT FOR CARRIAGE OF LAYERED HEVC BITSTREAM

(71) Applicant: QUALCOMM Incorporated, San Diego, CA (US)

(72) Inventors: Fnu Hendry, Poway, CA (US); Ying Chen, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 516 days.

(21) Appl. No.: 14/878,783

(22) Filed: Oct. 8, 2015

(65) Prior Publication Data

US 2016/0105688 A1 Apr. 14, 2016

Related U.S. Application Data

(60) Provisional application No. 62/064,428, filed on Oct. 15, 2014, provisional application No. 62/062,681, filed on Oct. 10, 2014.

(51) Int. Cl.
*H04N 19/85* (2014.01)
*H04N 19/463* (2014.01)
(Continued)

(52) U.S. Cl.
CPC ........... *H04N 19/85* (2014.11); *H04N 19/187* (2014.11); *H04N 19/188* (2014.11); *H04N 19/30* (2014.11);
(Continued)

(58) Field of Classification Search
CPC .... H04N 19/187; H04N 19/188; H04N 19/30; H04N 19/44; H04N 19/463; H04N 19/597; H04N 19/70; H04N 19/85
See application file for complete search history.

(56) References Cited

U.S. PATENT DOCUMENTS 9,774,927 B2 * 9/2017 Rusert ............ H04N 21/234327
2014/0086319 A1 * 3/2014 Xu ........................ H04N 19/30
375/240.12
(Continued)

FOREIGN PATENT DOCUMENTS

JP WO 2014/107312 * 10/2014
WO 2014107312 7/2014

OTHER PUBLICATIONS

Madec Gerard,Comments on Text of ISO/IEC,Jul. 2014.*
(Continued)

*Primary Examiner* — Md N Haque
(74) *Attorney, Agent, or Firm* — Shumaker & Sieffert, P.A.

(57) ABSTRACT

A device for processing a bitstream including video data, such as a demultiplexer, extracts a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extracts video data for one of the operation points from the bitstream based at least in part on the PTL structures to which the layers of the one of the operation points correspond, and provides the extracted video data to a video decoder.

58 Claims, 7 Drawing Sheets

(51) Int. Cl.

| | |
|---|---|
| *H04N 19/44* | (2014.01) |
| *H04N 19/597* | (2014.01) |
| *H04N 19/70* | (2014.01) |
| *H04N 19/30* | (2014.01) |
| *H04N 19/187* | (2014.01) |
| *H04N 19/169* | (2014.01) |

(52) U.S. Cl.
CPC ........... *H04N 19/44* (2014.11); *H04N 19/463* (2014.11); *H04N 19/597* (2014.11); *H04N 19/70* (2014.11)

(56) References Cited

U.S. PATENT DOCUMENTS

| | | | | |
|---|---|---|---|---|
| 2014/0086334 | A1* | 3/2014 | Haque | H04N 19/30 375/240.25 |
| 2014/0192858 | A1* | 7/2014 | Haque | H04N 19/597 375/240.02 |
| 2015/0195578 | A1 | 7/2015 | Chen et al. | |
| 2016/0021375 | A1 | 1/2016 | Hendry et al. | |
| 2016/0021398 | A1 | 1/2016 | Hendry et al. | |
| 2016/0295220 | A1* | 10/2016 | Oh | H04N 19/30 |

OTHER PUBLICATIONS

Madec Gerard, Commnents on Text of ISO/IEC, Jul. 2014.*
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011, (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16); JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "Carriage of HEVC multi-layer Extension Streams over MPEG-2 Systems", MPEG Meeting; Jan. 13-17, 2014; San Jose; (Motion Picture Expert Group or ISO/IEC JTC1/SC29/WG11) No. m32295, Jan. 8, 2014, XP030060747, 7 pp.
Chen, et al., "Carriage of HEVC Extension Streams with MPEG-2 Systems", MPEG Meeting; Oct. 28-Nov. 1, 2013; Geneva; (Motion Picture Expert Group or ISO/IEC JTC1/SC29/WG11), No. m31430, XP030059882, Oct. 24, 2013, 6 pp.
Gerard, "Comments on Text of ISO/IEC 13818-1:2013 / PDAM 7—Carriage of Layered HEVC," MPEG Meeting; Jul. 7-11, 2014; Sapporo; (Motion Picture Expert Group or ISO/IEC JTC1/SC29/WG11), No. m34380, Jul. 2014, XP030062753, 32 pp.
Gruneberg, et al., "Proposed Study Text of ISO-IEC_13818-1_2013_PDAMT_Carriage_of_Layered_HEVC," Mpeg Meeting; Jul. 7-11, 2014; Sapporo; (Motion Picture Expert Group or ISO/IEC JTC1/SC29/WG11) No. m34544, Jul. 9, 2014, XP030062917, 30 pp.
Hannuksela, "MV-HEVC/SHVC HLS: On additional layer sets; rewriting of simulcast layers; and profile-tier-level indication for auxiliary picture layers", JCT-3V Meeting; Mar. 29-Apr. 4, 2014; Valencia; (The Joint Collaborative Team on 3d Video Coding Extension Development of ISO/IEC JTC1/SC29/WG11 and ITU-T SG.16); URL: http://phenix.int-evry.fr/jct2/,, No. JCT3V-H0026, Mar. 18, 2014, XP030132075, 7 pp.
Hendry, et al., "On description of operation point for MPEG-2 TS L-HEVC," Oct. 2014; (Motion Picture Expert Group or ISO/IEC JTC1/SC29/WG11), No. M34996, 7 pp.
Hendry, et al., "On description of dependency information for MPEG-2 TS L-HEVC," Oct. 2014; (Motion Picture Expert Group or ISO/IEC JTC1/SC29/WG11), No. M34997, 5 pp.
Gruneberg, et al., "Study Text of ISO/IEC 13818-1:2013/PDAM7," Jul. 2014; (Motion Picture Expert Group or ISO/IEC JTC1/SC29/WG11), No. N14562, 1 pp.
"Information Technology—Generic Coding of Moving Pictures and Associated Audio Information: Systems," Amendment 7; Carriage of Layered HEVC, ISO/IEC 13818-1:2013/PDAM 7, Jul. 2014, 29 pp.
"Text of ISO/IEC 13818-1:2015/FDAM 2 Carriage of Layered HEVC," Jun. 2015; ISO/IEC JTC1/SC29/WG11 MPEG112/ N15468, 24 pp.
Boyce, et al., "Draft high efficiency video coding (HEVC) version 2, combined format range extensions (RExt), scalability (SHVC), and multi-view (MV-HEVC) extensions," Jun. 30-Jul. 9, 2014; (Joint Collaborative Team on Video Coding (JCT-VC) of ITU-T SG 16 WP3 and ISO/IEC JTC 1/SC 29/WG 11); No. JCTVC-R1013_v6; Oct. 1, 2014; 545 pp.
Kim, et al., "HM7: High Efficiency Video Coding (HEVC) Test Model 7 Encoder Description," Apr. 27-May 7, 2012; (Joint Collaborative Team on Video Coding (JCT-VC) of ITU-T SG 16 WP3 and ISO/IEC JTC 1/SC 29/WG 11); No. JCTVC-I1002, Jul. 9, 2012; 42 pp.
Chen, et al., "High efficiency video coding (HEVC) scalable extension Draft 7," Jun. 30-Jul. 9, 2014; (Joint Collaborative Team on Video Coding (JCT-VC) of ITU-T SG 16 WP3 and ISO/IEC JTC 1/SC 29/WG 11); No. JCTVC-R1008v_7; Oct. 1, 2014; 175 pp.
ITU-T H.222.0, Series H: Audiovisual and Multimedia Systems, Infrastructure of audiovisual services—Transmission multiplexing

(56) References Cited

OTHER PUBLICATIONS and synchronization, Information technology—Generic coding of moving pictures and associated audio information: systems, The International Telecommunication Union. Feb. 2000, 171 pp.
International Search Report and Written Opinion from International Application No. PCT/US2015/054865, dated Jan. 7, 2016, 16 pp.
Response to Written Opinion dated Jan. 7, 2016, from International Application No. PCT/US2015/054865, filed on Aug. 3, 2016, 8 pp.
Second Written Opinion from International Application No. PCT/US2015/054865, dated Oct. 7, 2016, 10 pp.
U.S. Appl. No. 62/064,428, filed Oct. 15, 2014, filed by Fnu Hendry.
Gruneberg, et al., "Text of ISO/IEC 13818-1:20131 Final Draft Amendment 3—Transport of HEVC video over MPEG-2 Systems," ISO/IEC JTC1/SC29/WG11 MPEG105/N13656; Jul. 2013; 18 pp.
International Preliminary Report on Patentability from International Application No. PCT/US2015/054865, dated Jan. 5, 2017, 12 pp.
Response to Second Written Opinion from International Application No. PCT/US2015/054865, filed Dec. 7, 2016, 8 pp.

\* cited by examiner

OPERATION POINT FOR CARRIAGE OF LAYERED HEVC BITSTREAM

This application claims the benefit of U.S. Provisional Application No. 62/062,681, filed Oct. 10, 2014, and U.S. Provisional Application No. 62/064,428, filed Oct. 15, 2014, the entire contents of each of which are hereby incorporated by reference.

TECHNICAL FIELD

This disclosure relates to video coding and, more particularly, to transport of coded video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), and ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for transporting coded video data in accordance with, e.g., MPEG-2 (Moving Pictures Experts Group) Systems. Transporting of coded video data may also be referred to as carriage of coded video data. For example, the disclosure describes example techniques, which may be improvements, of the MPEG-2 Transport Stream (TS) descriptor that is used for signaling of dependency information between layers of layered HEVC (High Efficiency Video Coding) bitstreams. The techniques of this disclosure may be used for transport of coded video data for an extension of a video coding standard, e.g., an extension of the HEVC standard. Such extensions may include multiview extensions (e.g., MV-HEVC), scalable extensions (e.g., SHVC), and three-dimensional extensions (e.g., 3D-HEVC).

In one example, a method of processing a bitstream including video data includes extracting a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extracting video data for one of the operation points from the bitstream based at least in part on the PTL structures to which the layers of the one of the operation points correspond, and providing the extracted video data to a video decoder.

In another example, A device for processing a bitstream including video data includes a memory to store data extracted from the bitstream, and one or more processing units configured to extract a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extract video data for one of the operation points from the bitstream based at least in part on the PTL structures to which the layers of the one of the operation points correspond, and provide the extracted video data to a video decoder.

In another example, a device for processing video data includes means for extracting a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, means for extracting video data for one of the operation points from the bitstream based at least in part on the PTL structures to which the layers of the one of the operation points correspond, and means for providing the extracted video data to a video decoder.

In another example, a computer-readable storage medium having stored thereon instructions that, when executed, cause a processor to extract a descriptor from a bitstream including video data, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extract video data for one of the operation points from the bitstream based at least in part on the PTL structures to which the layers of the one of the operation points correspond, and provide the extracted video data to a video decoder.

The details of one or more examples are set forth in the accompanying drawings and the description below. Other features, objects, and advantages will be apparent from the description and drawings, and from the claims.

DETAILED DESCRIPTION

Figure 1:
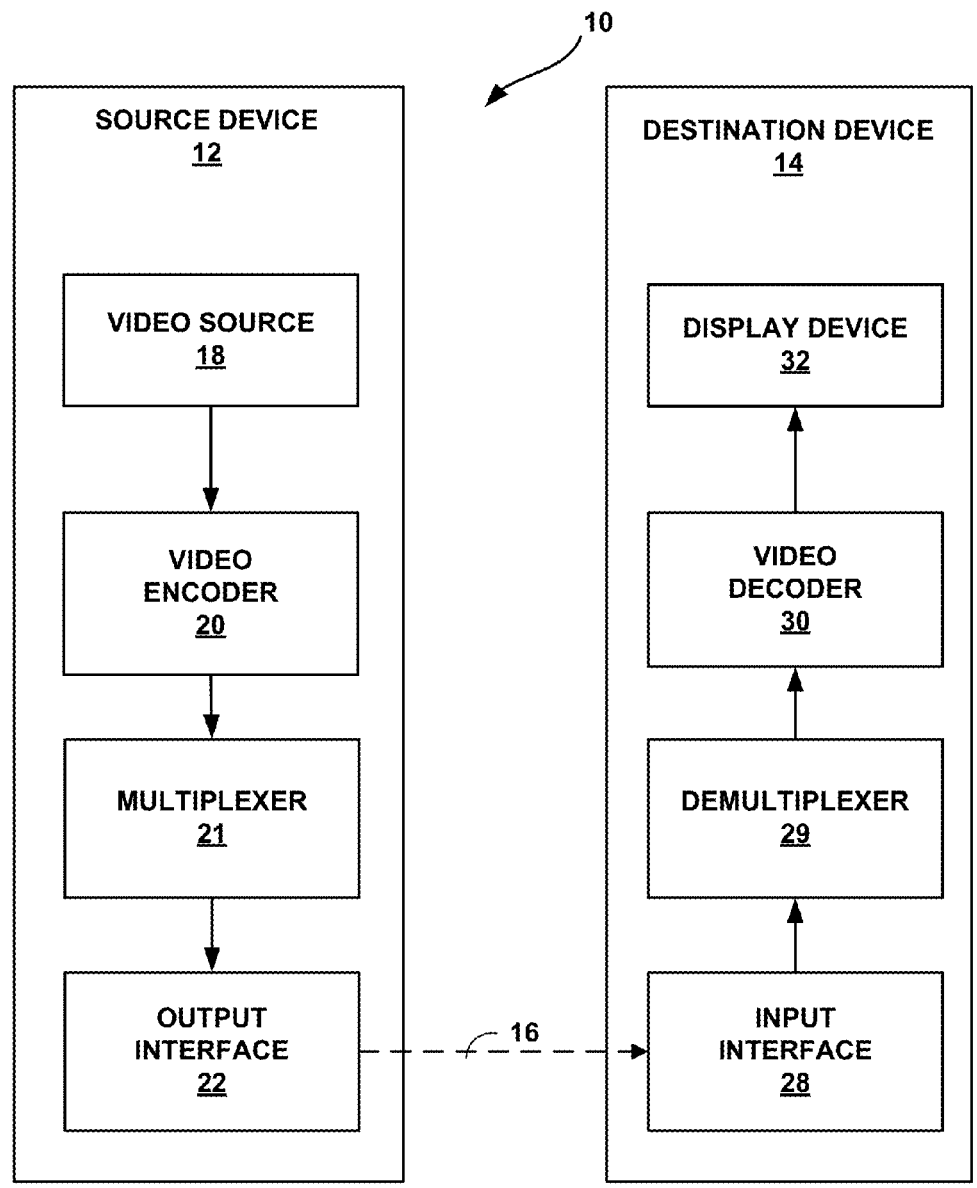
FIG. 1 is a block diagram illustrating an example video encoding and decoding system that may utilize techniques for transporting video data coded according to extensions of a video coding standard.

In general, this disclosure describes techniques related to Moving Picture Experts Group (MPEG)-2 Systems level data for media data. MPEG-2 Systems generally describes how two or more data streams are multiplexed together to form a single data stream. This disclosure describes techniques related to MPEG-2 Systems data for multi-layer video data. More particularly, this disclosure describes a MPEG-2 Transport Stream (TS) descriptor that can be used to signal dependency information between layers of layered HEVC bitstreams (e.g., describe the dependency (or relationship) between layers of layered HEVC bitstreams, which may be improvements relative to some existing techniques). The HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2015.

The techniques of this disclosure are generally directed to carriage (e.g., transport) of video data coded in accordance with an extension to a video coding standard (e.g., an extension to the High Efficiency Video Coding (HEVC) standard, the HEVC standard also referred to as ITU-T H.265). Such extensions may include multiview, three-dimensional, and/or scalable extensions. Thus, the techniques of this disclosure may be applied to multiview HEVC (MV-HEVC), three-dimensional HEVC (3D-HEVC), and scalable HEVC (SHVC).

Multi-layer video data, e.g., multi-view video data and/or video data with multiple scalable layers, may include designated operation points. In general, an operation point includes a subset of layers (e.g., views) of a full set of layers of multi-layer video data. The operation point may also identify target output layers, that is, layers for which data is to be output. In some instances, data of a layer may be included in an operation point only for use as a reference layer, and hence, such a layer would not be considered a target output layer.

One type of scalable dimension is the temporal dimension. For example, in temporal scalability, a set of video data may support various frame rates or playback rates, e.g., 15 frames per second (FPS), 30 FPS, 60 FPS, and 120 FPS. A given temporal level may include all pictures at that level and lower levels. For instance, continuing the previous example, a temporal level of 0 may correspond to 15 FPS, a temporal level of 1 may include pictures of temporal level 0 as well as pictures at temporal level 1 to support 30 FPS, a temporal level of 2 may include pictures of temporal levels 0 and 1 as well as pictures at temporal level 2 to support 60 FPS, and so on. A temporal identifier, or TemporalID, may be signaled as representative of the temporal level to which a particular picture belongs.

A destination device may use operation point descriptors included in a bitstream to select one of the operation points to be decoded and ultimately presented (e.g., displayed) to a user. Rather than passing data for all of the views to a video decoder upon receipt, the destination device may send only the views of a selected operation point to the video decoder. In this manner, the destination device may discard data for views that will not be decoded. Additionally or alternatively, an intermediate network device may discard data for views that do not correspond to a requested operation point, e.g., to better utilize bandwidth. The destination device may select an operation point based on the highest quality supported one of the operation points for a bitstream and/or based on an available amount of network bandwidth.

Video data can also be described by profiles, layers, and tiers. A "profile" is a subset of an entire bitstream syntax that is specified by an applicable video coding standard. A "level" corresponds to limitations of the decoder resource consumption, such as, for example, decoder memory and computation, which are related to the resolution of the pictures, bit rate, and block processing rate.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, named High-Efficiency Video Coding (HEVC), multiview extension to HEVC, named MV-HEVC, and scalable extension to HEVC, named SHVC, have been finalized by the Joint Collaboration Team on Video Coding (JCT-VC) of ITU-T Video Coding Experts Group (VCEG) and ISO/IEC Motion Picture Experts Group (MPEG).

The latest HEVC draft specification entitled "Draft high efficiency video coding (HEVC) version 2, combined format range extensions (RExt), scalability (SHVC), and multi-view (MV-HEVC) extensions" for JCT-VC of ITU-T SG 16 WP 3 and ISO/IEC JTC 1/SC 29/WG 11 18$^{th}$ Meeting: Sapporo, J P, 30 Jun.-9 Jul. 2014 (JCTVC-R1013_v6), is available from phenix.int-evey.fr/jct/doc_end_user/documents/18_Sapporo/wg11/JCTVC-R1013-v6.zip.

The latest MV-HEVC draft specification entitled "MV-HECV Draft Text 9" for Joint Collaborative Team on 3D Video Coding Extensions of ITU-T SG 16 WP 3 and ISO/IEC JTC 1/SC 29/WG 11 9$^{th}$ Meeting: Sapporo, J P, 3-9 Jul. 2014 (JCT3V-I1002-v7), is available from phenix.int-evey.fr/jct3v/doc_end_user/documents/9_Sapporo/wg11/JCT3V-I1002-v7.zip.

The SHVC draft specification entitled "High efficiency video coding (HEVC) scalable extension Draft 7" for JCT-VC of ITU-T SG 16 WP 3 and ISO/IEC JTC 1/SC 29/WG 11 18$^{th}$ Meeting: Sapporo, J P, 30 Jun.-9 Jul. 2014 (JCTVC-R1008v7) is available from phenix.int-evry.fr/jct/doc_end_user/documents/18_Sapporo/wg11/JCTVC-R1008-v7.zip.

MPEG-2 Systems (Moving Pictures Experts Group) technologies may be employed to transport video data. MPEG-2 Systems is sometimes referred to as MPEG-2 TS. The latest specification of MPEG-2 TS is the ITU-T recommendation H.222.0, 2012 June version, available from www.itu.int/rec/T-REC-H.222.0-201206-I/en, with fee. This specification provides support for the AVC and AVC extensions.

The amendment of MPEG-2 TS for HEVC has been developed. The latest document is "Text of ISO/IEC 13818-1: 2013/Final Draft Amendment 3—Transport of HEVC video over MPEG-2 Systems," in MPEG document w13656, July 2013. Recently, the amendment of MPEG-2 TS for carriage of layered HEVC has been started. The latest document is "Text of ISO/IEC 13818-1:2013/Study of PDAM 7—Carriage of Layered HEVC," in MPEG document w14562, July 2014 and will be referred as L-HEVC TS draft in this document. One example of the design of MPEG-2 TS for carriage of HEVC extensions is described in U.S. Provisional Patent Application No. 61/925,191, filed Jan. 8, 2014, and incorporated by reference herein. Another example of the design of MPEG-2 TS for carriage of HEVC extensions is described in U.S. Provisional Patent Application No. 62/025,432, filed Jul. 16, 2014.

The MPEG-2 Systems specification describes how compressed multimedia (video and/or audio) data streams may be multiplexed together with other data to form a single data stream suitable for digital transmission or storage. MPEG-2 Systems describes an elementary stream, which is a single, digitally coded (possibly MPEG-compressed) component of a program (also sometimes spelled "programme"). For example, the coded video or audio part of the program can be an elementary stream. An elementary stream is firstly converted into a packetized elementary stream (PES) before multiplexed into a program stream or a transport stream. Within the same program, a stream_id syntax element is used to distinguish the PES-packets belonging to one elementary stream from another.

Program stream and transport stream are two alternative multiplexes that target different applications. Program stream is biased for the storage and display of a single program from a digital storage service and a program stream is intended for use in error-free environments because it can be susceptible to errors. A program stream includes the elementary streams belonging to it and usually contains packets with variable length packets. In a program stream, PES-packets that are derived from the contributing elementary streams are organized into 'packs.' A pack includes a pack-header, an optional system-header and any number of PES-packets taken from any of the contributing elementary streams, in any order. The system header contains a summary of the characteristics of the program stream such as: its maximum data rate; the number of contributing video and audio elementary streams; further timing information. A decoder may use the information contained in a system header to determine whether the decoder is capable of decoding the program stream or not.

Transport stream is intended for the simultaneous delivery of a number of programs over potentially error-prone channels. It is a multiplex devised for multi-program applications such as broadcasting, so that a single transport stream can accommodate many independent programs.

A transport stream includes a succession of transport packets, and each of the transport packets is 188-bytes long. The use of short, fixed length packets means that the transport stream is not as susceptible to errors as the program stream. Further, each 188-byte-long transport packet is easily given additional error protection by processing it through a standard error protection process, such as Reed-Solomon encoding. The improved error resilience of the transport stream means that it has a better chance of surviving the error-prone channels to be found in a broadcast environment, for example.

It might seem that the transport stream is clearly the better of the two multiplexes with its increased error resilience and ability to carry many simultaneous programs. However, the transport stream is a more sophisticated multiplex than the program stream and is consequently more difficult to create and to demultiplex.

The first byte of a transport packet is a synchronization byte, which is 0x47 (that is, hex value 47, or 0100 0111). A single transport stream may carry many different programs, each comprising many packetised elementary streams. A 13-bit Packet Identifier (PID) field is used to distinguish transport packets containing the data of one elementary stream from those carrying the data of other elementary streams. It is the responsibility of the multiplexer to ensure that each elementary stream is awarded a unique PID value. The last byte of a transport packet is a continuity count field. It is incremented between successive transport packets belonging to the same elementary stream. This enables a decoder to detect the loss or gain of a transport packet and hopefully conceal the errors that might otherwise result from such an event.

Although the PID value makes clear to which elementary stream a transport packet belongs, the decoder may also need to determine which elementary streams belong to which program. Program specific information is used to explicitly specify the relationship between programs and component elementary streams. Program specific information may include a program map table (PMT), a program stream map (PSM), a program association table (PAT), a network information table (NIT), and/or a conditional access table (CAT).

Every program carried in a transport stream has a Program Map Table associated with it. This table provides details about the program and the elementary streams that form the program. For example, there may be a program with number 3 that contains video with PID 33, English audio with PID 57, and Chinese audio with PID 60. It is permitted for a PMT to include more than one program. The basic program map table may be embellished with some of the many descriptors specified within the MPEG-2 Systems specification. The descriptors convey further information about a program or its component elementary streams. The descriptors may include, for example, video encoding parameters, audio encoding parameters, language identification, pan-and-scan information, conditional access details, copyright information, and so on. A broadcaster or other user may define additional, private descriptors if required. In video-related component elementary streams, there is also a hierarchy descriptor, which provides information to identify the program elements containing components of hierarchically-coded video, audio, and private streams.

The PSM provides a description of the elementary streams in the Program Stream and their relationship to one another. When carried in a Transport Stream, this structure shall not be modified, per the MPEG-2 Systems specification. The PSM is present as a PES packet when the stream_id value is 0xBC (hex value BC, or 1011 1100).

A complete list of all programs available in a transport stream is maintained in the Program Association Table. This table can be easily found, as it always has the PID value 0. Each program is listed along with the PID value of the transport packets that contain its Program Map Table. Using the same example mentioned above, the PMT that specifies the elementary streams of program number 3 has a PID of 1001 and another PMT has another PID of 1002. This set of information is included in the PAT.

Program number zero, specified in the PAT, has a special meaning. This program is used to point the way to the Network Information Table. The NIT is optional. When present, the NIT is intended to provide information about the physical network carrying the transport stream, such as channel frequencies, satellite transponder details, modulation characteristics, service originator, service name, and details of alternative networks available.

If any elementary streams within a transport stream are scrambled, then a Conditional Access Table must be present, per the MPEG-2 Systems specification. The CAT provides details of the scrambling system(s) in use and provides the PID values of transport packets that contain the conditional access management and entitlement information. The format of this information is not specified within the MPEG-2 Systems specification.

In MPEG-2 TS, a hierarchy descriptor is designed to signal the hierarchy of sub-bitstreams in different elementary streams. The hierarchy descriptor provides information to identify the program elements containing components of hierarchically-coded video, audio, and private streams. Table 2-49 of the MPEG-2 Systems specification is reproduced below. As described in more detail, in some examples, the disclosure describes an improved hierarchy descriptor, and an update to the Table 2-49 shown immediately below. The updated Table 2-49 for the improved hierarchy descriptor is described in more detail further below.

TABLE 2-49

Hierarchy descriptor

| Syntax | No. of bits | Mnemonic |
|---|---|---|
| hierarchy_descriptor( ) { | | |
|     descriptor_tag | 8 | uimsbf |
|     descriptor_length | 8 | uimsbf |
|     reserved | 1 | bslbf |
|     temporal_scalability_flag | 1 | bslbf |
|     spatial_scalability_flag | 1 | bslbf |
|     quality_scalability_flag | 1 | bslbf |
|     hierarchy_type | 4 | uimsbf |
|     reserved | 2 | bslbf |
|     hierarchy_layer_index | 6 | uimsbf |
|     tref_present_flag | 1 | bslbf |
|     reserved | 1 | bslbf |

TABLE 2-49-continued

Hierarchy descriptor

| Syntax | No. of bits | Mnemonic |
|---|---|---|
|     hierarchy_embedded_layer_index | 6 | uimsbf |
|     reserved | 2 | bslbf |
|     hierarchy_channel | 6 | uimsbf |
| } | | |

Semantics for the syntax elements of Table 2-49 of MPEG-2 Systems are provided below:

temporal_scalability_flag—A 1-bit flag, which when set to '0' indicates that the associated program element enhances the frame rate of the bit-stream resulting from the program element referenced by the hierarchy_embedded_layer_index. The value of '1' for this flag is reserved.

spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bit-stream resulting from the program element referenced by the hierarchy_embedded_layer_index. The value of '1' for this flag is reserved.

hierarchy_type—The hierarchical relation between the associated hierarchy layer and its hierarchy embedded layer is defined in Table 2-50. If scalability applies in more than one dimension, this field shall be set to the value of '8' ("Combined Scalability"), and the flags temporal_scalability_flag, spatial_scalability_flag and quality_scalability_flag shall be set accordingly. For MVC video sub-bitstreams, this field shall be set to the value of '9' ("MVC video sub-bitstream") and the flags temporal_scalability_flag, spatial_scalability_flag and quality_scalability_flag shall be set to '1'. For MVC base view sub-bitstreams, this field shall be set to the value of '15' and the flags temporal_scalability_flag, spatial_scalability_flag and quality_scalability_flag shall be set to '1'.

hierarchy_layer_index—The hierarchy_layer_index is a 6-bit field that defines a unique index of the associated program element in a table of coding layer hierarchies. Indices shall be unique within a single program definition. For video sub-bitstreams of AVC video streams conforming to one or more profiles defined in Annex G of Rec. ITU-T H.264|ISO/IEC 14496-10, this is the program element index, which is assigned in a way that the bitstream order will be correct if associated SVC dependency representations of the video sub-bitstreams of the same access unit are re-assembled in increasing order of hierarchy_layer_index. For MVC video sub-bitstreams of AVC video streams conforming to one or more profiles defined in Annex H of Rec. ITU-T H.264|ISO/IEC 14496-10, this is the program element index, which is assigned in a way that the bitstream order will be correct if associated MVC view-component subsets of the MVC video sub-bitstreams of the same access unit are re-assembled in increasing order of hierarchy_layer_index.

tref_present_flag—A 1-bit flag, which when set to '0' indicates that the TREF field may be present in the PES packet headers in the associated elementary stream. The value of '1' for this flag is reserved.

hierarchy_embedded_layer_index—The hierarchy_embedded_layer_index is a 6-bit field that defines the hierarchy_layer_index of the program element that needs to be accessed and be present in decoding order before decoding of the elementary stream associated with this hierarchy_descriptor. This field is undefined if the hierarchy_type value is 15.

hierarchy_channel—The hierarchy_channel is a 6-bit field that indicates the intended channel number for the associated program element in an ordered set of transmission channels. The most robust transmission channel is defined by the lowest value of this field with respect to the overall transmission hierarchy definition. A given hierarchy_channel may at the same time be assigned to several program elements.

Table 2-50 of the MPEG-2 Systems specification is reproduced immediately below. In some examples, the disclosure describes updates to Table 2-50 as part of description of an improved hierarchy descriptor. The updated Table 2-50 is described in more detail further below.

TABLE 2-50

Hierarchy_type field values

| Value | Description |
|---|---|
| 0 | Reserved |
| 1 | Spatial Scalability |
| 2 | SNR Scalability |
| 3 | Temporal Scalability |
| 4 | Data partitioning |
| 5 | Extension bitstream |
| 6 | Private Stream |
| 7 | Multi-view Profile |
| 8 | Combined Scalability |
| 9 | MVC video sub-bitstream |
| 10-14 | Reserved |
| 15 | Base layer or MVC base view sub-bitstream or AVC video sub-bitstream of MVC |

In MPEG-2 TS, two descriptors are designed to signal characteristics of the sub-bitstreams for SVC and MVC respectively: SVC extension descriptor and MVC extension descriptor. SVC and MVC are the scalable video coding and multiview video coding extensions of ITU-T H.264/AVC. In addition, in MPEG-2 TS, there is an MVC operation point descriptor which describes the characteristics of operation points. The syntax and semantics of the three descriptors are provided below.

Table 2-96 below illustrates syntax elements for the SVC Extension Descriptor of MPEG-2 Systems. For video sub-bitstreams of AVC video streams conforming to one or more profiles defined in Annex G of Rec. ITU T H.264|ISO/IEC 14496-10, the SVC extension descriptor of Table 2-96 provides information about the AVC video stream resulting from re-assembling (up to) the associated video sub-bitstream and provides information about scalability and re-assembly of the associated video sub-bitstream. There may be one SVC extension descriptor associated with any of the video sub-bitstreams of an AVC video stream conforming to one or more profiles defined in Annex G of Rec. ITU-T H.264|ISO/IEC 14496-10.

TABLE 2-96

SVC extension descriptor

| Syntax | No. of bits | Mnemonic |
|---|---|---|
| SVC_extension_descriptor( ) { | | |
|   descriptor_tag | 8 | uimsbf |
|   descriptor_length | 8 | uimsbf |
|   width | 16 | uimsbf |
|   height | 16 | uimsbf |
|   frame_rate | 16 | uimsbf |
|   average_bitrate | 16 | uimsbf |
|   maximum_bitrate | 16 | uimsbf |
|   dependency_id | 3 | bslbf |
|   reserved | 5 | bslbf |
|   quality_id_start | 4 | bslbf |
|   quality_id_end | 4 | bslbf |
|   temporal_id_start | 3 | bslbf |
|   temporal_id_end | 3 | bslbf |
|   no_sei_nal_unit_present | 1 | bslbf |
|   reserved | 1 | bslbf |
| } | | |

Semantics for the syntax elements of Table 2-96 in accordance with the MPEG-2 Systems specification are provided below:

width—This 16-bit field indicates the maximum image width resolution, in pixels, of the re-assembled AVC video stream.

height—This 16-bit field indicates the maximum image height resolution, in pixels, of the re-assembled AVC video stream.

frame_rate—This 16-bit field indicates the maximum frame rate, in frames/256 seconds, of the re-assembled AVC video stream.

average_bitrate—This 16-bit field indicates the average bit rate, in kbit per second, of the re-assembled AVC video stream.

maximum_bitrate—This 16-bit field indicates the maximum bit rate, in kbit per second, of the re-assembled AVC video stream.

dependency_id—This 3-bit field indicates the value of dependency_id associated with the video sub-bitstream.

quality_id_start—This 4-bit field indicates the minimum value of the quality_id of the NAL unit header syntax element of all the NAL units contained in the associated video sub-bitstream.

quality_id_end—This 4-bit field indicates the maximum value of the quality_id of the NAL unit header syntax element of all the NAL units contained in the associated video sub-bitstream.

temporal_id_start—This 3-bit field indicates the minimum value of the temporal_id of the NAL unit header syntax element of all the NAL units contained in the associated video sub-bitstream.

temporal_id_end—This 3-bit field indicates the maximum value of the temporal_id of the NAL unit header syntax element of all the NAL units contained in the associated video sub-bitstream.

no_sei_nal_unit_present—This 1-bit flag when set to '1' indicates that no SEI NAL units are present in the associated video sub-bitstream. In case the no_sei_nal_unit_present flag is set to '1' for all SVC video sub-bitstreams and is not set to '1' or not present for the AVC video sub-bitstream of SVC, any SEI NAL units, if present, are included in the AVC video sub-bitstream of SVC. If the SVC extension descriptor is absent for all video sub-bitstreams, SEI NAL units may be present in any SVC dependency representation of an SVC video sub-bitstream, and may require re-ordering to the order of NAL units within an access unit as defined in Rec. ITU-T H.264|ISO/IEC 14496-10 before access unit re-assembling.

Table 2-97 below provides syntax for the MVC extension descriptor of the MPEG-2 Systems specification. For MVC video sub-bitstreams of AVC video streams conforming to one or more profiles defined in Annex H of Rec. ITU-T H.264|ISO/IEC 14496-10, the MVC extension descriptor provides information about the AVC video stream resulting from re-assembling (up to) the associated MVC video sub-bitstream and provides information about the contained MVC video sub-bitstream and for the re-assembly of the associated MVC video sub-bitstream. There may be one MVC extension descriptor associated with any of the MVC video sub-bitstreams (with stream_type equal to 0x20) of an AVC video stream conforming to one or more profiles defined in Annex H of Rec. ITU-T H.264|ISO/IEC 14496 10. When the MVC video sub-bitstream is an MVC base view sub-bitstream, the MVC extension descriptor shall be present in the associated PMT or PSM for stream_type equal to 0x1B.

TABLE 2-97

MVC extension descriptor

| Syntax | No. of bits | Mne- monic |
|---|---|---|
| MVC_extension_descriptor( ) { | | |
| descriptor_tag | 8 | uimsbf |
| descriptor_length | 8 | uimsbf |
| average_bit_rate | 16 | uimsbf |
| maximum_bitrate | 16 | uimsbf |
| reserved | 4 | bslbf |
| view_order_index_min | 10 | bslbf |
| view_order_index_max | 10 | bslbf |
| temporal_id_start | 3 | bslbf |
| temporal_id_end | 3 | bslbf |
| no_sei_nal_unit_present | 1 | bslbf |
| no_prefix_nal_unit_present | 1 | bslbf |
| } | | |

Semantics for the syntax elements of Table 2-97 in accordance with the MPEG-2 Systems specification are provided below:

average_bitrate—This 16-bit field indicates the average bit rate, in kbits per second, of the re-assembled AVC video stream. When set to 0, the average bit rate is not indicated.

maximum_bitrate—This 16-bit field indicates the maximum bit rate, in kbits per second, of the re-assembled AVC video stream. When set to 0, the maximum bit rate is not indicated.

view_order_index_min—This 10-bit field indicates the minimum value of the view order index of all the NAL units contained in the associated MVC video sub-bitstream.

view_order_index_max—This 10-bit field indicates the maximum value of the view order index of all the NAL units contained in the associated MVC video sub-bitstream.

temporal_id_start—This 3-bit field indicates the minimum value of the temporal_id of the NAL unit header syntax element of all the NAL units contained in the associated MVC video sub-bitstream.

temporal_id_end—This 3-bit field indicates the maximum value of the temporal_id of the NAL unit header syntax element of all the NAL units contained in the associated MVC video sub-bitstream.

no_sei_nal_unit_present—This 1-bit flag when set to '1' indicates that no SEI NAL units are present in the associated video sub-bitstream. In case the no_sei_nal_unit_present flag is set to '1' for all MVC video sub-bitstreams and is not set to '1' or not present for the AVC video sub-bitstream of MVC, any SEI NAL units, if present, are included in the AVC video sub-bitstream of MVC. If the MVC extension descriptor is absent for all MVC video sub-bitstreams, SEI NAL units may be present in any MVC view-component subset of an MVC video sub-bitstream, and may require re-ordering to the order of NAL units within an access unit as defined in Rec. ITU-T H.264|ISO/IEC 14496-10 before access unit re-assembling.

no_prefix_nal_unit_present—This 1-bit flag when set to '1' indicates that no prefix NAL units are present in either the AVC video sub-bitstream of MVC or MVC video sub-bitstreams. When this bit is set to '0', it indicates that prefix NAL units are present in the AVC video sub-bitstream of MVC only.

Table 2-100 below provides syntax for the MVC operation point descriptor of the MPEG-2 Systems specification. The MVC operation point descriptor (see Table 2-100) provides a method to indicate profile and level for one or more operation points each constituted by a set of one or more MVC video sub-bitstreams. If present, the MVC operation point descriptor shall be included in the group of data elements following immediately the program_info_length field in the program_map_section. If an MVC operation point descriptor is present within a program description, at least one hierarchy descriptor shall be present for each MVC video sub-bitstream present in the same program. According to the MPEG-2 Systems specification, in order to indicate different profiles, one MVC operation point descriptor per profile is used.

TABLE 2-100

MVC operation point descriptor

| Syntax | No. of bits | Mne- monic |
|---|---|---|
| MVC_operation_point_descriptor( ) { | | |
| descriptor_tag | 8 | uimsbf |
| descriptor_length | 8 | uimsbf |
| profile_idc | 8 | uimsbf |
| constraint_set0_flag | 1 | bslbf |
| constraint_set1_flag | 1 | bslbf |
| constraint_set2_flag | 1 | bslbf |
| constraint_set3_flag | 1 | bslbf |
| constraint_set4_flag | 1 | bslbf |
| constraint_set5_flag | 1 | bslbf |
| AVC_compatible_flags | 2 | bslbf |
| level_count | 8 | uimsbf |
| for ( recommendation =0; recommendation < level_count; i++ ) { | | |
| level_idc | 8 | uimsbf |
| operation_points_count | | |
| for ( j =0; j< operation_points_count; j++ ) { | 5 | bslbf |
| reserved | 3 | uimsbf |
| applicable_temporal_id | 8 | uimsbf |
| num_target_output_views | 8 | uimsbf |
| ES_count | | |
| for ( k =0; k< ES_count; k++ ) { | 2 | bslbf |
| reserved | 6 | uimsbf |
| ES_reference | | |
| } | | |
| } | | |
| } | | |
| } | | |

Semantics for the syntax elements of Table 2-100 in accordance with the MPEG-2 Systems specification are provided below:

profile_idc—This 8-bit field indicates the profile, as defined in Rec. ITU-T H.264|ISO/IEC 14496-10, of all operation points described within this descriptor for the MVC bitstream.

constraint_set0_flag, constraint_set1_flag, constraint_set2_flag, constraint_set3_flag, constraint_set4_flag, constraint_set5flag—These fields shall be coded according to the semantics for these fields defined in Rec. ITU-T H.264|ISO/IEC 14496-10.

AVC_compatible_flags—The semantics of AVC_compatible_flags are exactly equal to the semantics of the field(s) defined for the 2 bits between the constraint_set2 flag and the level_idc field in the sequence parameter set, as defined in Rec. ITU-T H.264|ISO/IEC 14496-10.

level_count—This 8-bit field indicates the number of levels for which operation points are described.

level_idc—This 8-bit field indicates the level, as defined in Rec. ITU-T H.264|ISO/IEC 14496-10, of the MVC bitstream for the operation points described by the following groups of data elements.

operation_points_count—This 8-bit field indicates the number of operation points described by the list included in the following group of data elements.

applicable_temporal_id—This 3-bit field indicates the highest value of the temporal_id of the VCL NAL units in the re-assembled AVC video stream.

num_target_output_views—This 8-bit field indicates the value of the number of the views, targeted for output for the associated operation point.

ES_count—This 8-bit field indicates the number of ES_reference values included in the following group of data elements. The elementary streams indicated in the following group of data elements together form an operation point of the MVC video bitstream. The value 0xff is reserved.

ES_reference—This 6-bit field indicates the hierarchy layer index value present in the hierarchy descriptor which identifies a video sub-bitstream. The profile and level for a single operation point, e.g., the entire MVC video bitstream, can be signaled using the AVC video descriptor. Beyond that, MVC allows for decoding different view subsets which can require different profiles and/or levels. The specification of the MVC operation point descriptor supports the indication of different profiles and levels for multiple operation points.

Table Amd7-1 below provides syntax for the HEVC video descriptor in accordance with the MPEG-2 Systems specification. For an HEVC video stream, the HEVC video descriptor provides basic information for identifying coding parameters, such as profile and level parameters, of that HEVC video stream. For an HEVC temporal video sub-bitstream or an HEVC temporal video subset, the HEVC video descriptor provides information such as the associated HEVC highest temporal sub-layer representation contained in the elementary stream to which it applies.

In the L-HEVC TS draft, profile, tier, and level (PTL) information and operation point information are signalled in an HEVC extension descriptor and an HEVC operation point descriptor.

TABLE Amd7-1

HEVC video descriptor

| Syntax | No. Of bits | Mnemonic |
|---|---|---|
| HEVC_descriptor( ) { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_idc | 8 | uimsbf |
|   temporal_layer_subset_flag | 1 | bslbf |
|   HEVC_still_present_flag | 1 | bslbf |
|   HEVC_24hr_picture_present_flag | 1 | bslbf |
|   reserved | 5 | bslbf |
|   if ( temporal_layer_subset_flag == '1') { | | |
|     reserved | 5 | bslbf |
|     temporal_id_min | 3 | uimsbf |
|     reserved | 5 | bslbf |
|     temporal_id_max | 3 | uimsbf |
|   } | | |
| } | | |

Semantics for the syntax elements of Table X-1 in accordance with the MPEG-2 Systems specification are provided below:

profile_space, tier_flag, profile_idc, profile_compatibility_indication, progressive_source_flag, interlaced_source_flag, non_packed_constraint_flag, frame_only_constraint_flag, reserved_zero_44 bits, level_idc—When the HEVC video descriptor applies to an HEVC video stream or to an HEVC complete temporal representation, these fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero 44 bits, general_level_idc, respectively, for the corresponding HEVC video stream or HEVC complete temporal representation, and the entire HEVC video stream or HEVC complete temporal representation to which the HEVC video descriptor is associated shall conform to the information signaled by these fields.

When the HEVC video descriptor applies to an HEVC temporal video sub-bitstream or HEVC temporal video subset of which the corresponding HEVC highest temporal sub-layer representation is not an HEVC complete temporal representation, these fields shall be coded according to semantics defined in Rec. ITU-T H.265|ISO/IEC 23008-2 for sub_layer_profile_space, sub_layer_tier_flag, sub_layer_profile_idc, sub_layer_profile_compatibility_flag[i], sub_layer_progressive_source_flag, sub_layer_interlaced_source_flag, sub_layer_non_packed_constraint_flag, sub_layer_frame_only_constraint_flag, sub_layer_reserved_zero_44 bits, sub_layer_level_idc, respectively, for the corresponding HEVC highest temporal sub-layer representation, and the entire HEVC highest temporal sub-layer representation to which the HEVC video descriptor is associated shall conform to the information signaled by these fields.

In one or more sequences in the HEVC video stream, the level may be lower than the level signaled in the HEVC video descriptor, while also a profile may occur that is a subset of the profile signaled in the HEVC video descriptor. However, in the entire HEVC video stream, only subsets of the entire bitstream syntax shall be used that are included in the profile signaled in the HEVC video descriptor, if present. If the sequence parameter sets in an HEVC video stream signal different profiles, and no additional constraints are signaled, then the stream may need examination to determine which profile, if any, the entire stream conforms to. If an HEVC video descriptor is to be associated with an HEVC video stream that does not conform to a single profile, then the HEVC video stream should be partitioned into two or more sub-streams, so that HEVC video descriptors can signal a single profile for each such sub-stream.

temporal_layer_subset_flag—This 1-bit flag, when set to '1', indicates that the syntax elements describing a subset of temporal layers are included in this descriptor. This field shall be set to 1 for HEVC temporal video subsets and for HEVC temporal video sub-bitstreams. When set to '0', the syntax elements temporal_id_min and temporal_id_max are not included in this descriptor.

HEVC_still_present_flag—This 1-bit field, when set to '1', indicates that the HEVC video stream or the HEVC highest temporal sub-layer representation may include HEVC still pictures. When set to '0', then the associated HEVC video stream shall not contain HEVC still pictures. According to Rec. ITU-T H.265|ISO/IEC 23008-2, IDR pictures are always associated to a TemporalId value equal to 0, Consequently, if the HEVC video descriptor applies to an HEVC temporal video subset, HEVC still pictures can only be present in the associated HEVC temporal video sub-bitstream.

HEVC_24_hour_picture_present_flag—This 1-bit flag, when set to '1', indicates that the associated HEVC video stream or the HEVC highest temporal sub-layer representation may contain HEVC 24-hour pictures. For the definition of an HEVC 24-hour picture, see 2.1.97. If this flag is set to '0', the associated HEVC video stream shall not contain any HEVC 24-hour picture.

temporal_id_min—This 3-bit field indicates the minimum value of the TemporalId, as defined in Rec. ITU-T H.265|ISO/IEC 23008-2, of all HEVC access units in the associated elementary stream.

temporal_id_max—This 3-bit field indicates the maximum value of the TemporalId, as defined in Rec. ITU-T H.265|ISO/IEC 23008-2, of all HEVC access units in the associated elementary stream.

TABLE Amd7-2

| HEVC operation point descriptor | | |
| --- | --- | --- |
| Syntax | No. Of bits | Mnemonic |
| HEVC_operation_point_descriptor( ) { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_count | 8 | uimsbf |
|   for ( i = 0; i < level_count; i++ ) { | | |
|     level_idc | 8 | uimsbf |
|     operation_points_count | 8 | uimsbf |
|     for ( j = 0; j < operation_points_count; j++ ) { | | |
|       reserved | 3 | bslbf |
|       constant_frame_rate_info_idc | 2 | uimsbf |
|       applicable_temporal_id | 3 | uimsbf |
|       num_target_output_views | 8 | uimsbf |
|       ES_count | 8 | uimsbf |
|       for ( k = 0; k < ES_count; k++ ) { | | |
|         reserved | 1 | bslbf |
|         prepend_dependencies | 1 | bslbf |
|         ES_reference | 6 | uimsbf |
|       } | | |
|       if ( constant_frame_rate_info_idc > 0 ) | | |
|       { | | |
|         reserved | 4 | bslbf |
|         frame_rate_indicator | 12 | uimsbf |
|       } | | |
|     } | | |
|   } | | |
| } | | |

Hendry et al., "TRANSPORT STREAM FOR CARRIAGE OF VIDEO CODING EXTENSIONS" U.S. application Ser. No. 14/800,498, filed Jul. 15, 2015, describes details regarding a design of MPEG-2 TS for carriage of HEVC extensions.

The techniques of this disclosure may be used to overcome certain issues with existing techniques for signaling descriptors used for dependency information between layers of layered HEVC bitstreams, such as those discussed below.

This disclosure recognizes an overlap of functionality of the hierarchy descriptor and the hierarchy extension descriptor. In the Study Text of ISO/IEC 13818-1:2013/PDAM7, there are two descriptors for signaling of dependency information; namely the hierarchy descriptor and the hierarchy extension descriptor. The two descriptors have overlapping functionality such as both are capable of describing spatial, quality, and multi-view type of dependency. In the L-HEVC TS draft, it is possible that both descriptors are present and associated with the same elementary stream. This would create confusion and add unnecessary complexity for implementing of the standard.

Although the hierarchy descriptor and the hierarchy extension descriptor have overlapping functionality, by itself, either of them cannot be used to describe all possible inter-layer dependency types in SHVC and MV-HEVC. The hierarchy descriptor is not capable of describing dependency of an auxiliary picture whereas the hierarchy extension descriptor is not capable of describing temporal dependency.

This disclosure also recognizes that there is a missing description of when the hierarchy extension descriptor shall be present. In the Study Text of ISO/IEC 13818-1:2013/PDAM7, the presence of the hierarchy descriptor or the hierarchy extension descriptor is not mandatory. The following describes when the hierarchy descriptor shall be present but there is no description of when hierarchy extension descriptor shall be present:

When an ITU-T Rec. H.222.0|ISO/IEC 13818-1 program includes more than one HEVC video temporal subset, or more than one HEVC temporal video sub-bitstream and at least one HEVC video temporal subset or at least one HEVC enhancement sub-partition, one or more hierarchy descriptor(s) as defined in 2.6.7 shall be present for all associated elementary streams with stream type equal to 0x24, 0x25 or 0x27 to 0x2A. The hierarchy descriptors shall be used to indicate the dependencies of all HEVC temporal video sub-bitstreams, HEVC video temporal subsets and HEVC sub-partitions.

Furthermore, this disclosure recognizes that there is a missing description of elementary stream reference when neither the hierarchy descriptor nor the hierarchy extension descriptor is present. For the signaling of operation points, a reference to an elementary stream is made by using the value of hierarchy_layer_index that is signaled in the hierarchy descriptor and the hierarchy extension descriptor. When none of the hierarchy descriptor and the hierarchy extension descriptor is present in a program, there is no description of how the reference to elementary stream for operation point signaling can be resolved.

This disclosure also recognizes that there are issues regarding signaling of profile, tier, and level (PTL) information. In the $9^{th}$ JCT3V and the $18^{th}$ JCT-VC meetings, it was agreed that PTL information is to be signalled for each layer in the layered HEVC bitstream (i.e., SHVC or MV-HEVC). Consequently, all the syntax and semantics of PTL information are designed for layer. On the other hand, in the L-HEVC TS draft, the signalling of PTL information is signalled for each operation point rather than for each layer included in each operation point. Such signalling is not correct as the signalling in the L-HEVC TS draft does not specifies different syntax and semantics for PTL information but simply refer to the syntax and semantic of PTL information defined in the SHVC/MV-HEVC draft specifications.

This disclosure further recognizes that there is an inefficiency of signaling PTL information. A layer in a layered HEVC bitstream may be part of one or more operation points. Considering that PTL information should be associated with layers within operation points, it is likely that the same PTL structures are signalled repeatedly if the PTL structures are signalled by using either HEVC extension descriptor or HEVC operation point. Therefore, the efficiency of signalling PTL information should be improved by avoiding repeating signalling of the same information.

Moreover, this disclosure recognizes that certain information is missing in operation point signaling. The current operation point signalling in either HEVC extension descriptor or HEVC operation point descriptor lacks critical information, such as the indication of the associated output layer set and the partitioning scheme. These two pieces of information are critical for determining the applicable HRD parameters for elementary streams in each operation point. As specified in the Annex F of Rec. ITU-T H.265|ISO/IEC 23008-2, applicable HRD parameter for a partition is determined by the value of bsp_hrd_idx, which is indexed by an index to the target output layer set (TargetOlsIdx), partitioning scheme (TargetPsIdx), highest temporal id (HighestTid), delivery schedule index (SchedSelCombIdx) as well as an index to the partition (partitionIdx). For transport of layered HEVC bitstream, the HighestTid is assigned based on the applicable/maximum temporal id of a operation point, SchedSelCombIdx is assigned based on the SchedSelIdx described in HEVC timing and HRD descriptor, and partitionIdx is assigned based on the index of the sub-partition. However, there is no value signalled/derived in any descriptors within the Study Text of ISO/IEC 13818-1:2013/PDAM7 that can be used to assign TargetOlsIdx and TargetPsIdx.

This disclosure also recognizes that there is the possibility of missing profile, missing tier, and/or missing level information for a program. According to the description of aggregation of elementary stream in sub clause 2.17.4 of L-HEVC TS draft, the presence of HEVC extension descriptor and HEVC operation point descriptor is not mandatory. When neither HEVC extension descriptor nor HEVC operation point descriptor are present, there is no PTL information associated with elementary streams in the program. The presence of PTL information is important for two reasons. First, PTL information is useful for system negotiation purpose. When PTL information is not available in the transport level, the system entity (e.g., smart middle-box in the middle of delivery system) is forced to look down to the codec level (i.e., the system entity must utilize and/or expend more resources to determine the PTL information from the codec level than those resources required to determine the PTL information from the transport level) which is a burden. Second, PTL information may be needed by a buffer model when there are no HRD parameters present.

The following describes examples in accordance with the disclosure. The example techniques may be implemented together or separately. In some examples, the example techniques may address the issues described above. However, addressing the issues described above is not necessary. For instance, the techniques described in this disclosure should not be considered limited to addressing the issues described above, or necessarily providing the advantages described in this disclosure. The issues described above and the potential advantages are merely provided for context and to assist with understanding, and should not be considered as a requirement.

A summary of certain methods of this disclosure is given below, with a detailed implementation of some example techniques provided further below. Some of these example techniques may be applied independently and some of them may be applied in combination.

In some examples, the existing HEVC extension descriptor and HEVC operation point descriptor may be merged into one descriptor (i.e., a single descriptor) and this single descriptor may re-use the name "HEVC operation point descriptor". This HEVC operation point descriptor may have the following components:
   a. A list of PTL structures. The PTL structures in the list shall be referred and associated with layers of operation point by indices.
   b. A list of operation points. Each operation point includes the following information:
      i. The associated output layer set
      ii. The associated partitioning scheme
      iii. The highest temporal sub-layer
      iv. List of elementary streams (i.e., sub-partition) that make up the operation point
      v. The number of output layers
      vi. Mapping of layer contained in each elementary streams of the operation point with PTL
      vii. Frame-rate information When dependency between elementary streams within an ITU-T Rec. H.222.0|ISO/IEC 13818-1 program is available (e.g., signalled in hierarchy descriptor or hierarchy extension descriptor), the list of elementary streams (i.e., sub-partition) that make-up an operation point may include only the minimum number of elementary streams. By using the available dependency information, the list of elementary streams that make-up the operation point can be populated.

When dependency between elementary streams within an ITU-T Rec. H.222.0|ISO/IEC 13818-1 program is available (e.g., signalled in hierarchy descriptor or hierarchy extension descriptor), the list of elementary streams (i.e., sub-partition) that make-up an operation point may be required to include the complete list of elementary streams that make-up the operation point.

In one example, instead of signalling the number of output layers in an operation point, for each layer of included in the operation point, a flag is signalled to indicate whether or not the layer is an output layer. Alternatively, both the number of output layers and the flag indication (indicating whether a respective layer is an output layer) for each layer may be signalled.

When there are more than one HEVC operation point descriptors present for ITU-T Rec. H.222.0|ISO/IEC 13818-1 program, the following may apply. First, the list of PTL information signalled in the (n+1)-th HEVC operation point descriptor, where n starts from 1, may be the continuation of the list of PTL information signalled in the n-th HEVC operation point descriptor. Second, the list of operation points signalled in the (n+1)-th HEVC operation point descriptor, where n starts with 1, may be the continuation of the list of operation points signalled in the n-th HEVC operation point descriptor. In other words, information from two or more consecutive HEVC operation point descriptors as signaled may be concatenated to form a single descriptor. That is, similar information may be signaled in two or more distinct HEVC operation point descriptors, and this information may be concatenated as if all of the information were signaled in a single descriptor.

The HEVC operation point descriptor described herein may be a program-level descriptor (i.e., signalled together with other descriptors that come immediately after syntax element program_info_length field in the program map table). Alternatively, the HEVC operation point descriptor may be an elementary stream level descriptor (i.e., signalled together with other descriptors that come after syntax element ES_info_length field in the program map table).

The presence of the HEVC operation point descriptor may be mandatory when a program has one or more elementary streams with stream_type equal to 0x27, 0x28, 0x29 or 0x2A. Likewise, the presence of the HEVC video descriptor may be mandatory for each elementary stream with stream_type equal to 0x24 and 0x25.

In some examples, the hierarchy extension descriptor may be modified to support describing temporal dependency/enhancement. For this purpose, one of the reserved values in Table amd7-4—Semantics of extension dimension bits in the L-HEVC TS draft is allocated for temporal enhancement.

In some examples, the hierarchy descriptor is modified to support auxiliary layer enhancement. For this purpose, the following may apply:
   a. Use one of the reserved flags in the syntax table of hierarchy_descriptor to indicate auxiliary enhancement.
   b. Assign one of the reserved values in Table 2-50—hierarchy_type fields values to indicate auxiliary enhancement.

In some examples, to avoid overlapping use of the hierarchy descriptor and the hierarchy extension descriptor, the following may be utilized:
   a. For each elementary stream that carries HEVC coded picture, one descriptor (and in some examples, exactly one), either the hierarchy descriptor or the hierarchy extension descriptor, may (and in some examples, shall) be present and associated with the elementary stream.
   b. For each elementary stream that contains pictures with layerId equal to 0, a hierarchy descriptor may (and in some examples, shall) be present and associated with the elementary stream.
   c. For each elementary stream that does not contain pictures with layerId equal to 0 and that contains pictures with layerId unequal to 0, a hierarchy extension descriptor may (and in some examples, shall (i.e., must)) be present and associated with the elementary stream.

FIG. 1 is a block diagram illustrating an example video encoding and decoding system 10 that may utilize techniques for transporting video data coded according to extensions of a video coding standard. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablets, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, multiplexer 21, and output interface 22. Destination device 14 includes input interface 28, demultiplexer 29, video decoder 30, and display device 32. In accordance with this disclosure, multiplexer 21 of source device 12 may be configured to apply the techniques for transporting video data coded according to extensions of a video coding standard, while demultiplexer 29 may receive such data for processing and forward the processed video data to, e.g., video decoder 30. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for transporting video data coded according to extensions of a video coding standard may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed the HEVC standard, and continues to work on extensions of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three (and may be thirty-five) intra-prediction encoding modes.

In general, the working model of the HM describes that a video frame or picture may be divided into a sequence of treeblocks or largest coding units (LCUs) (also referred to as "coding tree units") that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

Video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

This disclosure describes techniques for the carriage of HEVC extension bitstreams. That is, in accordance with the techniques of this disclosure, multiplexer 21 and/or demultiplexer 29 may be configured to transport video data (that is, send or receive video data) that is coded according to an extension of a video coding standard, such as HEVC, an extension of the HEVC standard (e.g., SHVC or MV-HEVC), or other as-yet undeveloped video coding standards. In general, multiplexer 21 may encapsulate encoded video data to form a bitstream, e.g., substantially in accordance with MPEG-2 Systems and the techniques of this disclosure, while demultiplexer 29 may receive and decapsulate encapsulated data, e.g., video data encoded according to an extension of a video coding standard.

In some examples, multiplexer 21 and demultiplexer 29 may be configured to code a revised version of the operation point descriptor of Table Amd7-1, as discussed above. The table below, labeled "Proposed Table Amd7-1—HEVC Operation Point Descriptor," represents one example of modifications to the current Table Amd7-1. The HEVC operation point descriptor described below may be used to perform certain techniques of this disclosure. Italicized text in the table below emphasizes additions relative to the current Table Amd7-1, as shown above.

PROPOSED TABLE Amd7-1

| HEVC operation point descriptor | | |
|---|---|---|
| Syntax | No. Of bits | Mnemonic |
| HEVC_operation_point_descriptor( ) { | | |
|   descriptor_tag | 8 | uimsbf |
|   descriptor_length | 8 | uimsbf |
|   reserved | 1 | uimsbf |
|   *num_profile_tier_level* | 7 | uimsbf |
|   *for( i = 0; i < num_profile_tier_level; i++, ptlIdx++ ) {* | | |
|     *profile_space[ptlIdx]* | 2 | uimsbf |
|     *tier_flag[ptlIdx]* | 1 | bslbf |
|     *profile_idc[ptlIdx]* | 5 | uimsbf |
|     *profile_compatibility_indication[ptlIdx]* | 32 | bslbf |
|     *progressive_source_flag[ptlIdx]* | 1 | bslbf |
|     *interlaced_source_flag[ptlIdx]* | 1 | bslbf |
|     *non_packed_constraint_flag[ptlIdx]* | 1 | bslbf |
|     *frame_only_constraint_flag[ptlIdx]* | 1 | bslbf |
|     *reserved_zero_44bits[ptlIdx]* | 44 | bslbf |
|     *level_idc[ptlIdx].* | 8 | uimsbf |
|   } | | |
|   num_operation_points | 8 | uimsbf |
|   for ( i = 0; i < num_operation_points; i++, opIdx++ ) | | |
| { | 8 | uimsbf |
|     *target_ols[opIdx]* | | |
|     *target_partitioning_scheme[opIdx]* | 5 | uimsbf |
|     reserved | 3 | bslbf |
|     max_temporal_id[opIdx] | 2 | uimsbf |
|     reserved | 6 | uimsbf |
|     es_count[opIdx] | | |
|     for ( j = 0; j < es_count[opIdx; j++ ) { | 1 | uimsbf |
|       reserved | 1 | uimsbf |
|       prepend_dependencies[opIdx] | 6 | uimsbf |
|       es_reference[opIdx][j] | | |
|     } | 6 | uimsbf |
|     num_target_output_layers[opIdx] | 4 | uimsbf |
|     reserved | 6 | uimsbf |
|     *num_layers[opIdx]* | | |
|     *for( j = 0; j < num_layers[opIdx]; j++ ) {* | 1 | uimsbf |
|       output_layer_flag[opIdx][j] | 7 | uimsbf |
|       *ptl_ref_idx[opIdx][j]* | | |
|     } | | |
|     reserved | 6 | uimsbf |
|     constant_frame_rate_info_idc[opIdx] | 2 | uimsbf |
|     if ( constant_frame_rate_info_idc[opIdx] > 0 ) | | |
|     { | 4 | bslbf |
|       reserved | 12 | uimsbf |
|       frame_rate_indicator[opIdx] | | |
|     } | | |
|   } | | |
| } | | |

Example semantics for the added syntax elements of this table are described below. Semantics for the other syntax elements may remain the same as in L-HEVC TS.

num_profile_tier_level—An 8-bit field that specifies the number of profile, tier and level structures signalled in this descriptor.

profile_space[ptlIdx], tierflag[ptlIdx], profile_idc[ptlIdx], profile_compatibility_indication[ptlIdx], progressive_source_flag[ptlIdx], interlaced_source_flag[ptlIdx], non_packed_constraint_flag[ptlIdx], frame_only_constraint_flag [ptlIdx], reserved_zero_44 bits[ptlIdx], level_idc[ptlIdx]—These fields shall be coded according to the semantics defined in Rec. ITU-T H.265|ISO/IEC 23008-2 for general_profile_space, general_tier_flag, general_profile_idc, general_profile_compatibility_flag[i], general_progressive_source_flag, general_interlaced_source_flag, general_non_packed_constraint_flag, general_frame_only_constraint_flag, general_reserved_zero_44 bits, level_idc, respectively, for layers of HEVC operation points described within this descriptor.

The value of ptlIdx and opIdx are both initialized to equal to 0 for the first HEVC operation point of a program.

num_operation_points—This 8-bit field indicates the number of operation points described in this descriptor.

target_ols[opIdx]—An 8-bit field that specifies the output layer set associated with opIdx-th operation point defined in this descriptor.

target_partitioning_scheme[opIdx]—An 8-bit field that specifies the partitioning scheme of the output layer set associated with opIdx-th operation point defined in this descriptor.

max_temporal_id[opIdx]—A 3-bit field that specifies the highest TemporalId of the NAL units belong to the opIdx-th operation point defined in this descriptor.

es_count[opIdx]—An 8-bit field that specifies the number of es_reference values included in the following group of data elements. The aggregation of elementary streams, according to the ordered list indicated in the following group of data elements, forms an HEVC operation point. The value 0xff is reserved.

prepend_dependencies[opIdx][j]—An 1-bit flag that is when set to 1 indicates that the elementary stream signalled by the syntax element hierarchy_embedded_layer_index in the hierarchy descriptor and hierarchy_extension_descriptor with the hierarchy layer index value specified by the following syntax element es_reference[opIdx][j] shall be added to the list of elementary streams for the target operation point before the elementary stream signalled by the es_reference[opIdx][j]. If the elementary stream signalled by hierarchy_embedded_layer_index has further dependencies signalled by hierarchy descriptors, these dependencies shall be added to the ES list in a recursive manner. When there is no hierarchy descriptor and hierarchy extension descriptors present for any of the elementary stream referred by the syntax element ES_reference[opIdx][j], the value of prepend_dependencies[opIdx][j] shall not be equal to 1.

ES_reference[opIdx] [j]—A 6-bit field that specifies the hierarchy layer index value present in the hierarchy descriptor which identifies an elementary stream.

num_target_output_layers[opIdx]—This 6-bit field specifies the value of the number of layers, targeted for output for the optIdx-th operation point defined in this descriptor.

num_layers[opIdx]—An 6-bit field that specifies the number of layers included in the optIdx-th operation point defined in this descriptor.

output_layerflag[opIdx][j]—A 1-bit field when assigned value '1' indicates that the j-th layer of the opIdx-th operation point defined in this descriptor is an output layer. Otherwise, when assigned value '0', it indicates that the j-th layer of the opIdx-th operation point defined in this descriptor is not an output layer.

ptl_ref_idx[opIdx][j]—An 8-bit field that specifies the index to the profile, tier and level that is assigned to the j-th layer of the optIdx-th operation point defined in this descriptor.

constant_frame_rate_info_idc[opIdx]—A 2-bit field, in combination with the syntax element frame_rate_indicator as specified below, that specifies how the frame rate for the associated opIdx-th operation point defined in this descriptor is determined. The value of 0 indicates that the frame rate is not specified for the operation point and that the syntax element frame_rate_indicator is not present in this descriptor for the operation point.

frame_rate_indicator[opIdx]—If constant_frame_rate_info_idc[opIdx] equals 1, this 12-bit field indicates a constant number of ticks, as specified in the HEVC timing and HRD descriptor, for the distance in time between two pictures at the i-th operation point defined in this descriptor. Else if constant_frame_rate_info_idc[opIdx] equals 2, this 12-bit field indicates the frame rate for the operation point measured in frames per second. Else if constant_frame_rate_info_idc[opIdx] equals 3, this 12-bit field indicates the frame rate for the operation point measured in frames per 1.001 seconds.

Thus, a descriptor according to Proposed Table Amd7-1 represents an example of a descriptor including a set of profile, tier, and level (PTL) structures and data that associates each of the layers of each of the operation points with a corresponding one of the PTL structures. That is, the elements recited in the "for (i=0; i<num_profile_tier_level; i++, ptlIdx++)" loop represent an example of a set of profile, tier, and level (PTL) structures, while the elements recited in the "for (j=0; j<num_layers[opIdx]; j++)" loop represent examples of data that associates each of the layers of each of the operation points with a corresponding one of the PTL structures.

A descriptor according to Proposed Table Amd7-1 also represents an example of a descriptor including values for target output layer set syntax elements for each of the operation points, wherein the target output layer set syntax elements specify the target output layer sets associated with the corresponding operation points. That is, the target_ols [opIdx] syntax elements represent examples of values for target output layer set syntax elements for each of the operation points, because these values specify the target output layer sets associated with the corresponding operation points.

Accordingly, demultiplexer 29 may extract the descriptor from the bitstream to determine PTL structures for each operation point of the bitstream. That is, demultiplexer 29 may extract data within each of the "for (i=0; i<num_profile_tier_level; i++, ptlIdx++)," such as the profile_idc[ptlIdx], tier_flag[ptlIdx], and level_idc[ptlIdx] syntax elements, to determine various sets of profile, tier, and level information. Each of these sets may correspond to a single PTL data structure, which demultiplexer 29 may instantiate, indexed in order. Demultiplexer 29 may further iterate through each layer of each operation point and determine which of the PTL data structures corresponds to each layer of each operation point based on the ptl_ref_idx[opIdx][j] syntax element. That is, "opIdx" represents an index to an operation point, and "j" represents an index to a layer of the operation point. Thus, the value of the ptl_ref_idx[opIdx][j] syntax element represents one of the PTL data structures to which the $j^{th}$ layer of the $opIdx^{th}$ operation point corresponds.

Moreover, demultiplexer 29 may determine a target output layer set for each of the operation points. That is, for each of the operation points, demultiplexer 29 may retrieve a value for target_ols[opIdx], which represents the target output layer set for the operation point represented by "opIdx."

This disclosure also describes examples in which a hierarchy descriptor and a hierarchy extension descriptor that may be used to signal data for an HEVC layer (elementary stream), such as describing dependency (possibly dependency of layers). For example, the hierarchy descriptor and the hierarchy extension descriptor, of this disclosure, may be different than existing hierarchy descriptors and hierarchy extension descriptors. Accordingly, when this disclosure uses the term "hierarchy extension descriptor" or "hierarchy descriptor," the disclosure is referring to updated versions of such descriptors, unless it is clear from the description that the previous version of such descriptors is being referenced. In some examples, either or both of these modified hierarchy extension descriptor or hierarchy descriptor may be merged with the HEVC operation point descriptor of Proposed Table Amd7-1, as discussed above.

Accordingly, demultiplexer 29 may be configured to determine dependencies between elementary streams using, e.g., the hierarchy descriptor and/or the hierarchy extension descriptor, as discussed above.

Multiplexer 21 may be configured to form the HEVC operation point descriptor, the hierarchy descriptor and/or the hierarchy extension descriptor, while demultiplexer 29 may use the HEVC operation point descriptor, the hierarchy descriptor and/or the hierarchy extension descriptor to process received video data, e.g., to assemble the video data into a form that can be used by video decoder 30. Although not shown in the example of FIG. 1, an intermediate device may also use these descriptors, e.g., to perform sub-bitstream extraction. For example, a media aware network element (MANE) may perform sub-bitstream extraction using the HEVC operation point descriptor, the hierarchy descriptor, and/or hierarchy extension descriptor.

Multiplexer 21, demultiplexer 29, video encoder 20, and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In this manner, demultiplexer 29 represents an example of a device including a memory to store data extracted from the bitstream, and one or more processing units configured to extract a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extract video data for one of the operation points from the bitstream based at least in part on the PTL structures to which the layers of the one of the operation points correspond, and provide the extracted video data to a video decoder.

Figure 2:
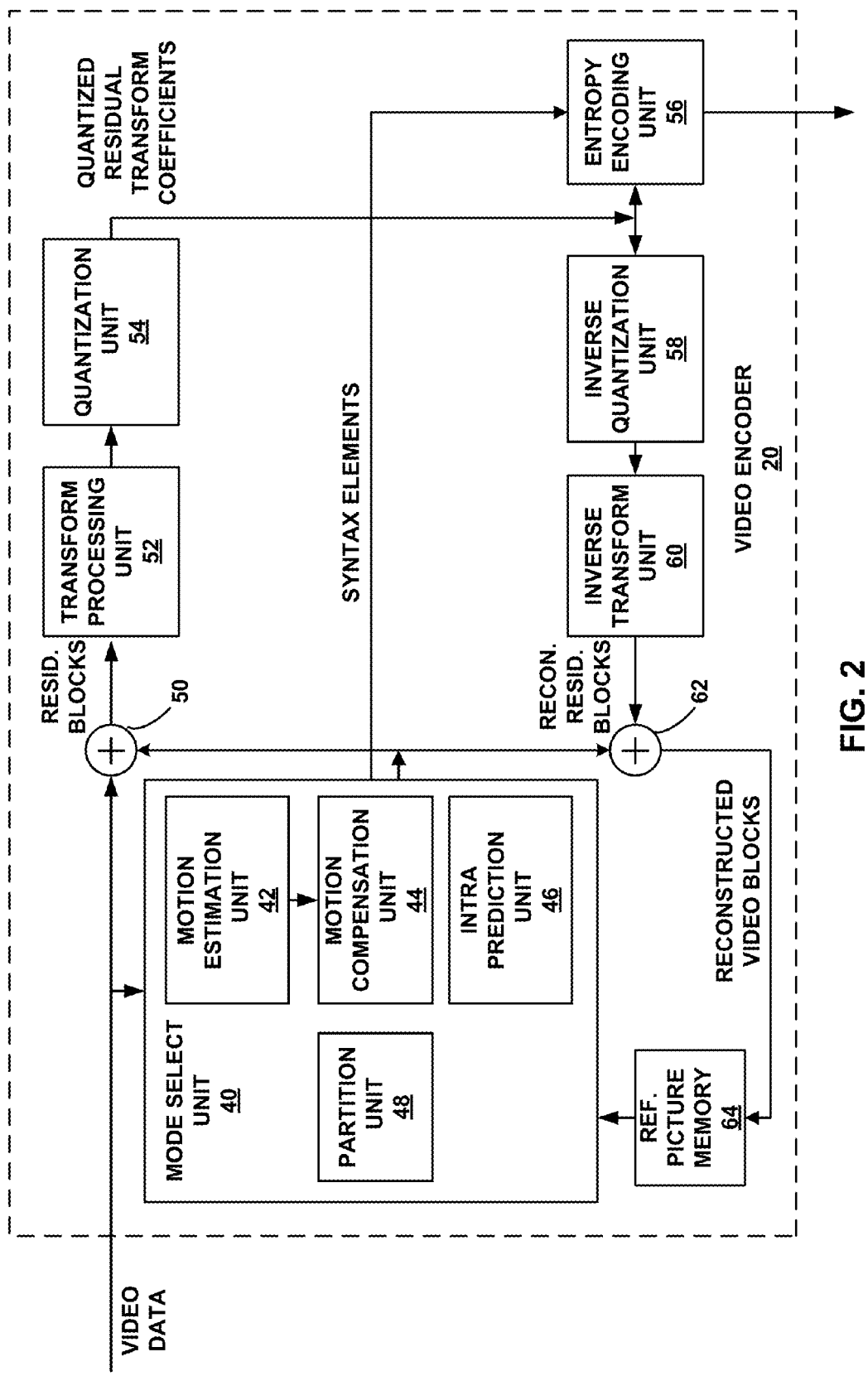
FIG. 2 is a block diagram illustrating an example of a video encoder that may implement techniques for transporting video data coded according to extensions of a video coding standard.

FIG. 2 is a block diagram illustrating an example of video encoder 20 that may implement techniques for transporting video data coded according to extensions of a video coding standard. The video data may include multiple (e.g., two or more) enhancement layers to a base layer, where the enhancement layers may correspond to different scalability dimensions. Video encoder 20 may perform intra- and inter-coding of video blocks within video slices. Intra-coding relies on spatial prediction to reduce or remove spatial redundancy in video within a given video frame or picture. Inter-coding relies on temporal or inter-layer prediction to reduce or remove redundancy in video within frames or pictures of a video sequence or of a reference layer (e.g., a reference view). Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-predicted block to summer 50 to generate residual block data and to summer 62 to reconstruct the encoded block for use in a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Alternatively, motion estimation unit 42 may perform inter-layer (e.g., inter-view) prediction for a block of a picture in a dependent layer. For example, motion estimation unit 42 may be configured to calculate a disparity motion vector when performing inter-view prediction of a picture in a dependent view. In other examples, motion compensation unit 44 may perform zero-motion-vector prediction of a block when performing inter-layer prediction, e.g., when an enhancement layer corresponds to a scalability dimension for which blocks in the enhancement layer are positioned at the same or substantially the same position as blocks in the base layer being enhanced. Such scalability dimensions may include, for example, chroma bit depth, color format, color gamut, PSNR, or the like.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The quantization process may also be referred to as a "scaling" process, and thus, quantized transform coefficients may also be referred to as "scaled transform coefficients." The degree of quantization (or scaling) may be modified by adjusting a quantization parameter. In some examples, entropy encoding unit 56 may then perform a scan of the matrix including the quantized transform coefficients.

Following quantization, entropy encoding unit 56 entropy codes the scanned, quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
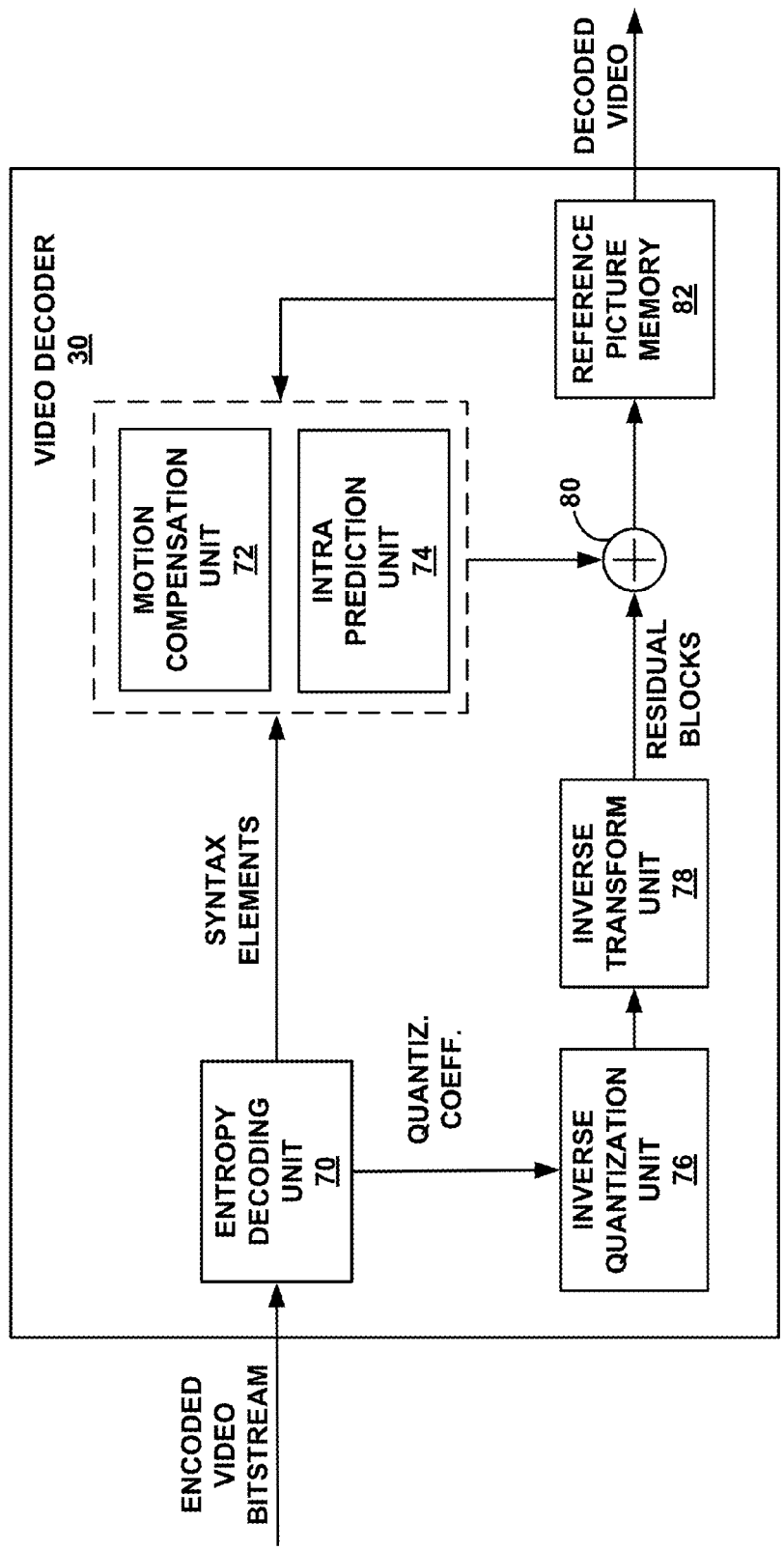
FIG. 3 is a block diagram illustrating an example of a video decoder that may implement techniques for transporting video data coded according to extensions of a video coding standard.

FIG. 3 is a block diagram illustrating an example of video decoder 30 that may implement techniques for transporting video data coded according to extensions of a video coding standard. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In some examples, motion compensation unit 72 may perform zero-motion-vector prediction of a block when performing inter-layer prediction, e.g., when an enhancement layer corresponds to a scalability dimension for which blocks in the enhancement layer are positioned at the same or substantially the same position as blocks in the base layer being enhanced. Such scalability dimensions may include, for example, chroma bit depth, color format, color gamut, PSNR, or the like. Alternatively, motion compensation unit 72 may use disparity motion vectors to predict blocks of a dependent view from one or more reference views (e.g., a base view). It should be understood that a view is one example of a layer. That is, when an enhancement layer is a view, the scalability dimension may correspond to a view dimension (e.g., to provide data for producing a three-dimensional effect for a viewer).

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
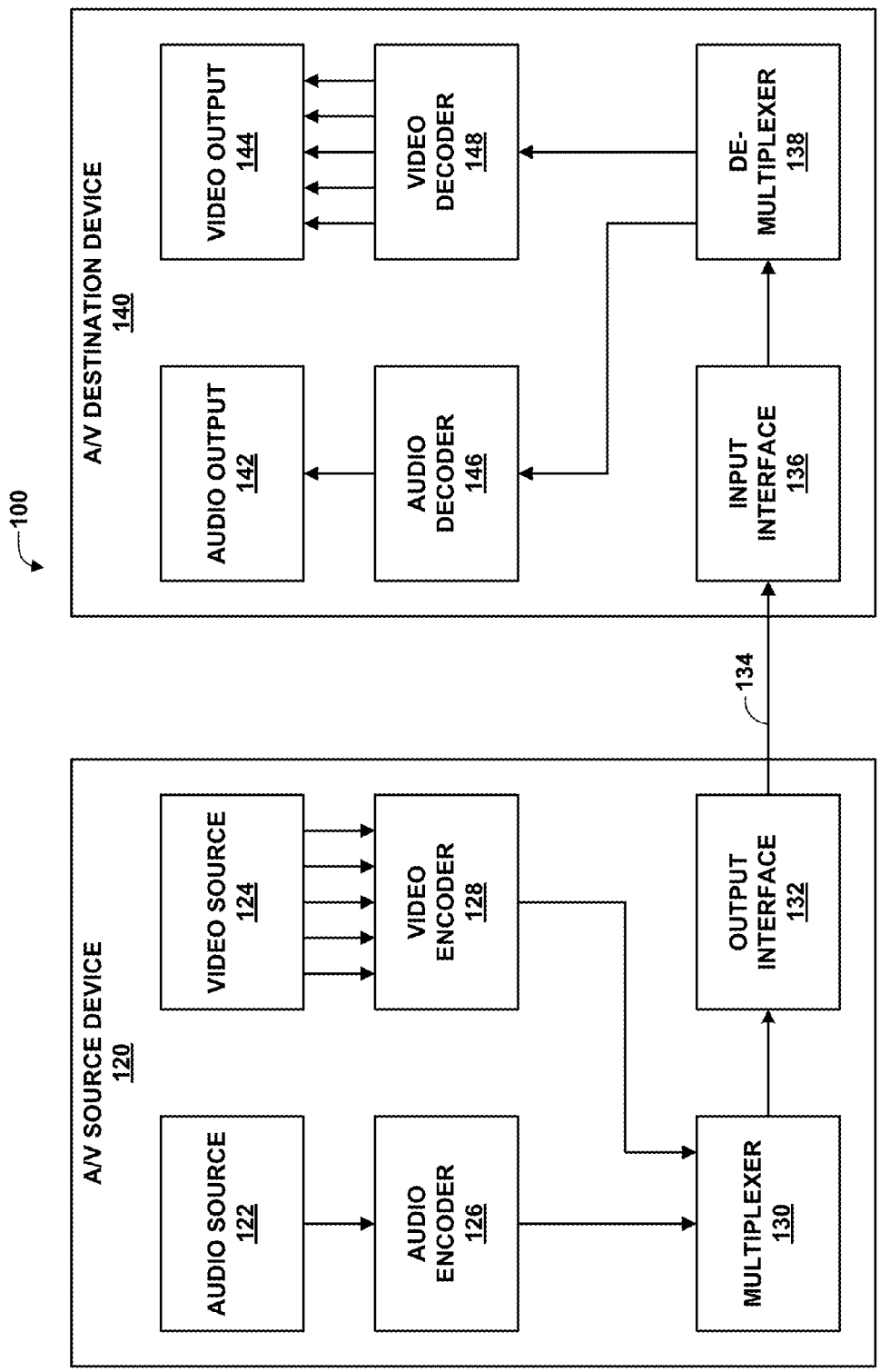
FIG. 4 is a block diagram illustrating an example system in which an audio/video (A/V) source device transports audio and video data to an A/V destination device.

FIG. 4 is a block diagram illustrating an example system 100 in which audio/video (A/V) source device 120 transports audio and video data to A/V destination device 140. System 100 of FIG. 4 may correspond to a video teleconference system, a server/client system, a broadcaster/receiver system, or any other system in which video data is sent from a source device, such as A/V source device 120, to a destination device, such as A/V destination device 140. In some examples, A/V source device 120 and A/V destination device 140 may perform bidirectional information exchange. That is, A/V source device 120 and A/V destination device 140 may be capable of both encoding and decoding (and transmitting and receiving) audio and video data. In some examples, audio encoder 126 may comprise a voice encoder, also referred to as a vocoder.

A/V source device 120, in the example of FIG. 4, comprises audio source 122 and video source 124. Audio source 122 may comprise, for example, a microphone that produces electrical signals representative of captured audio data to be encoded by audio encoder 126. Alternatively, audio source 122 may comprise a storage medium storing previously recorded audio data, an audio data generator such as a computerized synthesizer, or any other source of audio data. Video source 124 may comprise a video camera that produces video data to be encoded by video encoder 128, a storage medium encoded with previously recorded video data, a video data generation unit, or any other source of video data.

"Raw" (i.e., captured or acquired data that has not been coded) audio and video data may comprise analog or digital data. Analog data may be digitized before being encoded by audio encoder 126 and/or video encoder 128. Audio source 122 may obtain audio data from a speaking participant while the speaking participant is speaking, and video source 124 may simultaneously obtain video data of the speaking participant. In other examples, audio source 122 may comprise a computer-readable storage medium comprising stored audio data, and video source 124 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 122 contemporaneously with video data captured by video source 124 that is contained within the video frames. For example, while a speaking participant generally produces audio data by speaking, audio source 122 captures the audio data, and video source 124 captures video data of the speaking participant at the same time, that is, while audio source 122 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 126 may encode a timestamp in each encoded audio frame that represents a time at which the audio data for the encoded audio frame was recorded, and similarly, video encoder 128 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 120 may include an internal clock from which audio encoder 126 and/or video encoder 128 may generate the timestamps, or that audio source 122 and video source 124 may use to associate audio and video data, respectively, with a timestamp.

In some examples, audio source 122 may send data to audio encoder 126 corresponding to a time at which audio data was recorded, and video source 124 may send data to video encoder 128 corresponding to a time at which video data was recorded. In some examples, audio encoder 126 may encode a sequence identifier in encoded audio data to indicate a relative temporal ordering of encoded audio data but without necessarily indicating an absolute time at which the audio data was recorded, and similarly, video encoder 128 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and/or video) data, and reception and subsequent interpretation and decoding of the transported multimedia data. The techniques of this disclosure are particularly applicable to transport of Multiview Video Coding (MVC) data, that is, video data comprising a plurality of views. As shown in the example of FIG. 4, video source 124 may provide a plurality of views of a scene to video encoder 128. Multiview coding may be useful for generating three-dimensional video data to be used by a three-dimensional display, such as a stereoscopic or autostereoscopic three-dimensional display.

A/V source device 120 may provide a "service" to A/V destination device 140. A service generally corresponds to a subset of available views of multiview data. For example, multiview data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data. An operation point may correspond to a service, such that A/V source device 120 may further provide an operation point descriptor for each service provided by A/V source device 120.

A/V source device 120, in accordance with the techniques of this disclosure, is able to provide services that correspond to a subset of views. In general, a view is represented by a view identifier, also referred to as a "view_id." View identifiers generally comprise syntax elements that may be used to identify a view. An MVC encoder provides the view_id of a view when the view is encoded. The view_id may be used by an MVC decoder for inter-view prediction or by other units for other purposes, e.g., for rendering.

Inter-view prediction is a technique for encoding MVC video data of a frame with reference to one or more frames at a common temporal location as the encoded frame of different views. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

Each individual stream of data (whether audio or video) is referred to as an elementary stream. An elementary stream is a single, digitally coded (possibly compressed) component of a program. For example, the coded video part or coded audio part of the program can be an elementary stream. An elementary stream may be converted into a packetized elementary stream (PES) before being multiplexed into a program stream or a transport stream. Within the same program, a stream ID is used to distinguish the PES-packets belonging to one elementary stream from another. The basic unit of data of an elementary stream is a packetized elementary stream (PES) packet. Thus, each view of MVC video data corresponds to respective elementary streams. Similarly, audio data corresponds to one or more respective elementary streams.

An MVC coded video sequence may be separated into several sub-bitstreams, each of which is an elementary stream. Each sub-bitstream may be identified using an MVC view_id subset. Based on the concept of each MVC view_id subset, an MVC video sub-bitstream is defined. An MVC video sub-bitstream contains the NAL units of the views listed in the MVC view_id subset. A program stream generally contains only the NAL units which are from those of the elementary streams. It is also designed that any two elementary streams cannot contain an identical view.

In the example of FIG. 4, multiplexer 130 receives elementary streams comprising video data from video encoder 128 and elementary streams comprising audio data from audio encoder 126. In some examples, video encoder 128 and audio encoder 126 may each include packetizers for forming PES packets from encoded data. In other examples, video encoder 128 and audio encoder 126 may each interface with respective packetizers for forming PES packets from encoded data. In still other examples, multiplexer 130 may include packetizers for forming PES packets from encoded audio and video data.

A "program," as used in this disclosure, may comprise a combination of audio data and video data, e.g., an audio elementary stream and a subset of available views delivered by a service of AN source device 120. Each PES packet includes a stream_id that identifies the elementary stream to which the PES packet belongs. Multiplexer 130 is responsible for assembling elementary streams into constituent program streams or transport streams. A program stream and a transport stream are two alternative multiplexes targeting different applications.

In general, a program stream includes data for one program, while a transport stream may include data for one or more programs. Multiplexer 130 may encode either or both of a program stream or a transport stream, based on a service being provided, a medium into which the stream will be passed, a number of programs to be sent, or other considerations. For example, when the video data is to be encoded in a storage medium, multiplexer 130 may be more likely to form a program stream, whereas when the video data is to be streamed over a network, broadcast, or sent as part of video telephony, multiplexer 130 may be more likely to use a transport stream.

Multiplexer 130 may be biased in favor of using a program stream for the storage and display of a single program from a digital storage service. A program stream is intended for use in error-free environments or environments less susceptible to encountering errors, because program streams are rather susceptible to errors. A program stream simply comprises the elementary streams belonging to it and usually contains packets of variable lengths. In a program stream, PES-packets that are derived from the contributing elementary streams are organized into "packs." A pack comprises a pack-header, an optional system-header, and any number of PES-packets taken from any of the contributing elementary streams, in any order. The system header contains a summary of the characteristics of the program stream such as its maximum data rate, the number of contributing video and audio elementary streams, further timing information, or other information. A decoder may use the information contained in a system header to determine whether or not the decoder is capable of decoding the program stream.

Multiplexer 130 may use a transport stream for the simultaneous delivery of a plurality of programs over potentially error-prone channels. A transport stream is a multiplex devised for multi-program applications such as broadcasting, so that a single transport stream can accommodate many independent programs. A transport stream may comprise a succession of transport packets, with each of the transport packets being 188-bytes long. The use of short, fixed length packets causes the transport stream to be less susceptible to errors than the program stream. Further, each 188-byte-long transport packet may be given additional error protection by processing the packet through a standard error protection process, such as Reed-Solomon encoding. The improved error resilience of the transport stream means that it has a better chance of surviving the error-prone channels to be found in a broadcast environment, for example.

It might seem that the transport stream is better than a program stream due to its increased error resilience and ability to carry many simultaneous programs. However, the transport stream is a more sophisticated multiplex than the program stream and is consequently more difficult to create and more complicated to demultiplex than a program stream. The first byte of a transport packet may be a synchronization byte having a value of 0x47 (hexadecimal 47, binary '01000111,' decimal 71). A single transport stream may carry many different programs, each program comprising many packetized elementary streams. Multiplexer 130 may use a thirteen-bit Packet Identifier (PID) field to distinguish transport packets containing the data of one elementary stream from those carrying the data of other elementary streams. It is the responsibility of the multiplexer to ensure that each elementary stream is awarded a unique PID value. The last byte of a transport packet may be the continuity count field. Multiplexer 130 increments the value of the continuity count field between successive transport packets belonging to the same elementary stream. This enables a decoder or other unit of a destination device, such as A/V destination device 140, to detect the loss or gain of a transport packet and hopefully conceal the errors that might otherwise result from such an event.

Multiplexer 130 receives PES packets for elementary streams of a program from audio encoder 126 and video encoder 128 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units contain the core compression engine and may comprise block, macroblock, and/or slice levels. Other NAL units are non-VCL NAL units.

Multiplexer 130 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of an NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus, can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element may comprise syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit.

A NAL unit including video data in its payload may comprise various granularity levels of video data. For example, a NAL unit may comprise a block of video data, a macroblock, a plurality of macroblocks, a slice of video data, or an entire frame of video data. Multiplexer 130 may receive encoded video data from video encoder 128 in the form of PES packets of elementary streams. Multiplexer 130 may associate each elementary stream with a corresponding program by mapping stream ids to corresponding programs, e.g., in a database or other data structure, such as a Program Map Table (PMT) or Program Stream Map (PSM).

Multiplexer 130 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 120 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

Multiplexer 130 may also embed data regarding a program in a NAL unit. For example, multiplexer 130 may create a NAL unit comprising a Program Map Table (PMT) or a Program Stream Map (PSM). In general, a PMT is used to describe a transport stream, while a PSM is used to describe a program stream. As described in greater detail with respect to the example of FIG. 2 below, multiplexer 130 may comprise or interact with a data storage unit that associates elementary streams received from audio encoder 126 and video encoder 128 with programs and accordingly with respective transport streams and/or program streams.

As with most video coding standards, H.264/AVC and HEVC define the syntax, semantics, and decoding process for error-free bitstreams, any of which conform to a certain profile or level. These standards do not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The MPEG-2 Systems standard allows for extensions of the system by way of "descriptors." Both PMTs and PSMs include descriptor loops in which one or more descriptors may be inserted. In general, a descriptor may comprise a data structure that may be used to extend the definition of programs and/or program elements. This disclosure describes an operation point descriptors for performing the techniques of this disclosure. In general, the operation point descriptor of this disclosure enhances the conventional MVC extension descriptor by describing a rendering capability, a decoding capability, and a bitrate for an operation point. A destination device, such as A/V destination device 140, may use operation point descriptors for each operation point to select one of the operation points of a bitstream to be decoded.

Each PMT or PSM may include an operation point descriptor that describes characteristics of an operation point. For example, source device 120 may provide the operation point descriptor to provide a rendering capability value that describes a rendering capability for client/destination device 140. In order for client device 140 to properly render (e.g., display) video data of the operation point, client device 140 should satisfy the rendering capabilities signaled by the rendering capability value. The rendering capability value may describe, for example, a number of views to be displayed (e.g., a number of views targeted for rendering) and/or the frame rate of the video data for the views. Thus, client device 140 may determine that the rendering capabilities are satisfied when video output 144 of client device 140 is able to display the number of views of the operation point at the frame rate specified by the operation point descriptor.

After multiplexer 30 has assembled a NAL unit and/or an access unit from received data, multiplexer 30 passes the unit to output interface 132 for output. Output interface 132 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 132 outputs the NAL unit or access unit to a computer-readable medium 134, such as, for example, a transmission channel, a magnetic medium, an optical medium, a memory, a flash drive, or other computer-readable medium.

Ultimately, input interface 136 retrieves the data from computer-readable medium 134. Input interface 136 may comprise, for example, an optical drive, a magnetic media drive, a USB port, a receiver, a transceiver, or other computer-readable medium interface. Input interface 136 may provide the NAL unit or access unit to demultiplexer 138. Demultiplexer 138 may demultiplex a transport stream or program stream into constituent PES streams, depacketize the PES streams to retrieve encoded data, and send the encoded data to either audio decoder 146 or video decoder 148, depending on whether the encoded data is part of an audio or video stream, e.g., as indicated by PES packet headers of the stream. Audio decoder 146 decodes encoded audio data and sends the decoded audio data to audio output 142, while video decoder 148 decodes encoded video data and sends the decoded video data, which may include a plurality of views of a stream, to video output 144. Video output 144 may comprise a display that uses a plurality of views of a scene, e.g., a stereoscopic or autostereoscopic display that presents each view of a scene simultaneously.

In particular, demultiplexer 138 may select an operation point of a received bitstream. For example, demultiplexer 138 may compare characteristics of operation points of the bitstream to select an appropriate operation point to be used by A/V destination device 140. In general, demultiplexer 138 may attempt to select one of the operation points that will provide the highest quality viewing experience for a user that can be decoded by video decoder 148. For example, demultiplexer 138 may compare the rendering capabilities and decoding capabilities of video decoder 148 to the suggested rendering and decoding capabilities signaled by the operation point descriptors of the bitstream. Of the operation points that demultiplexer 138 determines could be properly decoded by video decoder 148, demultiplexer 138 may select an operation point that will provide the highest quality video data, e.g., the highest frame rate and/or bitrate. In other examples, demultiplexer 138 may select one of the supported operation points based on other considerations, such as, for example, power consumption.

In general, system 100 may correspond substantially to system 10 of FIG. 1. Likewise, multiplexer 130 may correspond substantially to multiplexer 21 of FIG. 1, demultiplexer 138 may correspond substantially to demultiplexer 29 of FIG. 1, and other similarly named components of system 100 may correspond substantially to similarly named components of FIG. 1. Thus, multiplexer 130 and demultiplexer 138 may be configured to perform any of the various techniques described in this disclosure, alone or in any combination.

Figure 5:
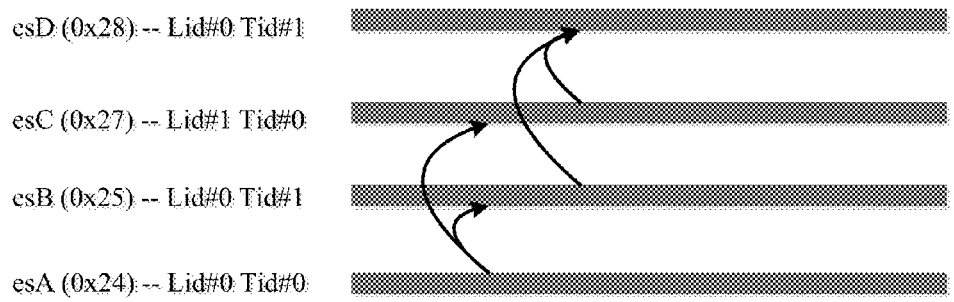
FIG. 5 is a conceptual diagram illustrating an example of dependency among elementary streams.

The following describes some example use cases. The use of the hierarchy descriptor and hierarchy extension descriptor can be illustrated in the following example. FIG. 5 is a conceptual diagram illustrating an example illustrating L-HEVC bitstreams carried in four elementary streams. For instance, given a program containing L-HEVC bitstreams carried in four elementary streams as depicted in FIG. 5, the dependency information for each elementary streams is signaled as follows:
  a. A hierarchy descriptor shall be present for esA to describe that esA is a base layer elementary stream.
  b. A hierarchy descriptor shall be present for esB to describe that esB has temporal dependency to esA.
  c. A hierarchy extension descriptor shall be present for esC to describe that esC has layer dependency to esA.
  d. A hierarchy extension descriptor shall be present for esD to describe that:
    i. esD has layer dependency to esB.
    ii. esD has temporal dependency to esC.

In one alternative or addition to avoid overlapping use of the hierarchy descriptor and the hierarchy extension descriptor, the following is proposed:
  a. For each elementary stream that carries HEVC coded picture, one (e.g., exactly one) descriptor, either the hierarchy descriptor or the hierarchy extension descriptor, may (in one example, shall) be present and associated with the elementary stream.
  b. A hierarchy descriptor may (in one example, shall) be present and associated with an elementary stream if the elementary stream has dependency (e.g., temporal, spatial, multiview, etc) to exactly one other reference elementary stream. A reference elementary stream of a current elementary stream is an elementary stream that is directly dependent on by the current elementary stream.
  c. A hierarchy extension descriptor may (in one example, shall) be present and associated with an elementary stream if the elementary stream has dependency to more than one reference elementary streams.

Figure 6:
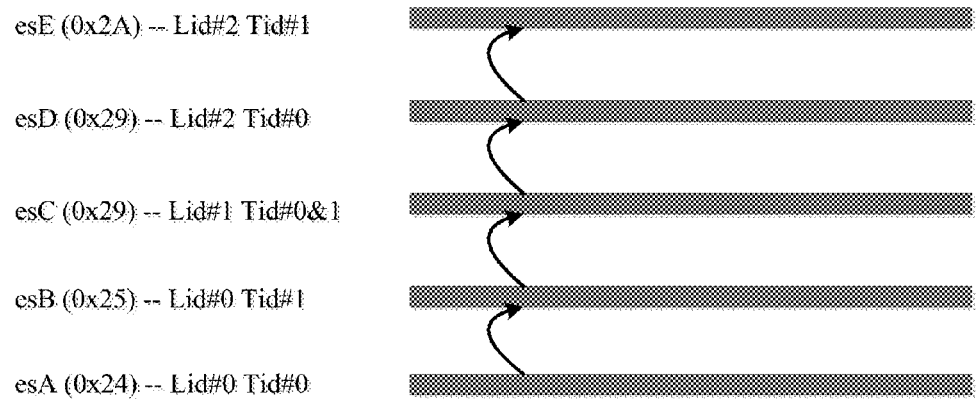
FIG. 6 is another conceptual diagram illustrating an example of dependency among elementary streams.

FIG. 6 is another example of dependency among elementary streams. Like FIG. 5, L-HEVC bitstreams carried in four elementary streams is illustrated. The use of the hierarchy descriptor and hierarchy extension descriptor in this alternative or additional example for the dependency structure as shown in FIG. 5 are as follows:
  a. A hierarchy descriptor shall be present for esA to describe that esA is a base layer elementary stream.
  b. A hierarchy descriptor shall be present for esB to describe that esB has temporal dependency to esA.
  c. A hierarchy descriptor shall be present for esC to describe that esC has layer dependency to esA.
  d. A hierarchy extension descriptor shall be present for esD to describe that:
    iii. esD has layer dependency to esB
    iv. esD has temporal dependency to esC.

For the given dependency structure in FIG. 6, use of the hierarchy descriptor and hierarchy extension descriptor in this alternative is as follows:

a. A hierarchy descriptor shall be present for esA to describe that esA is a base layer elementary stream.
b. A hierarchy descriptor shall be present for esB to describe that esB has temporal dependency to esA.
c. A hierarchy descriptor shall be present for esC to describe that esC has layer dependency to esB:
d. A hierarchy descriptor shall be present for esD to describe that esD has layer dependency to esC.
e. A hierarchy descriptor shall be present for esE to describe that esE has temporal dependency to esD.

Figure 7:
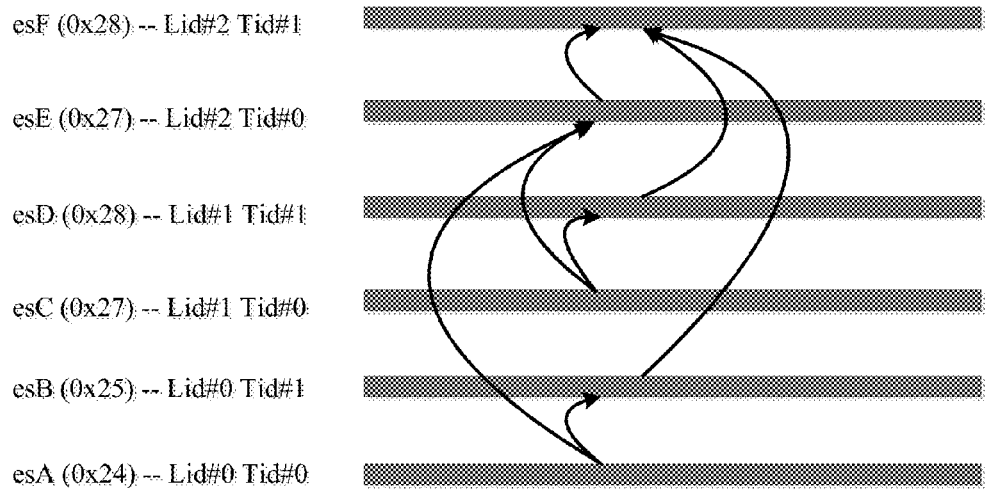
FIG. 7 is another conceptual diagram illustrating an example of dependency among elementary streams.

FIG. 7 illustrates another example of the dependency structure. For the given dependency structure in FIG. 7 (possibly FIG. 6), use of the hierarchy descriptor and hierarchy extension descriptor in this alternative is as follows:

a. A hierarchy descriptor shall be present for esA to describe that esA is a base layer elementary stream.
b. A hierarchy descriptor shall be present for esB to describe that esB has temporal dependency to esA.
c. A hierarchy descriptor shall be present for esC to describe that esC is an independently coded elementary stream.
d. A hierarchy descriptor shall be present for esD to describe that esD has temporal dependency to esC.
e. A hierarchy extension descriptor shall be present for esE to describe that:
  i. esE has layer dependency to esC
  ii. esE has layer dependency to esA.
f. A hierarchy extension descriptor shall be present for esF to describe that:
  iii. esF has temporal dependency to esE
  iv. esF has layer dependency to esD.
  v. esF has layer dependency to esB.

In the second alternative or additional example to avoid overlapping use of the hierarchy descriptor and the hierarchy extension descriptor, the following is proposed:

a. A hierarchy descriptor shall be present and associated with an elementary stream if the elementary stream has temporal dependency.
b. A hierarchy descriptor shall be present and associated with an elementary stream if the elementary stream has layer dependency (e.g., spatial, multi-view, quality) to exactly one other reference elementary stream.
c. A hierarchy extension descriptor shall be present and associated with an elementary stream if the elementary stream has layer dependency to more than one reference elementary streams.

The use of the hierarchy descriptor and hierarchy extension descriptor in this alternative or additional example for the dependency structure as shown in FIG. 5 (and possibly FIG. 6 or 7) are as follows:

a. A hierarchy descriptor shall be present for esA to describe that esA is a base layer elementary stream.
b. A hierarchy descriptor shall be present for esB to describe that esB has temporal dependency to esA.
c. A hierarchy descriptor shall be present for esC to describe that esC has layer dependency to esA.
d. Two hierarchy descriptors shall be present for esD to describe that esD has temporal dependency to esC and esD has layer dependency to esB.

The use of the hierarchy descriptor and hierarchy extension descriptor in this alternative for the dependency structure as shown in FIG. 7 (possibly FIG. 5 or 6) are as follows:

a. A hierarchy descriptor shall be present for esA to describe that esA is a base layer elementary stream.
b. A hierarchy descriptor shall be present for esB to describe that esB has temporal dependency to esA.
c. A hierarchy descriptor shall be present for esC to describe that esC is an independently coded elementary stream.
d. A hierarchy descriptor shall be present for esD to describe that esD has temporal dependency to esC.
e. A hierarchy extension descriptor shall be present for esE to describe that:
  v. esE has layer dependency to esC
  vi. esE has layer dependency to esA.
f. A hierarchy descriptor shall be present for esF to describe that esF has temporal dependency to esE.
g. A hierarchy extension descriptor shall be present for esF to describe that:
  vii. esF has layer dependency to esD
  viii. esF has layer dependency to esB In the third alternative or additional example to avoid overlapping use of the hierarchy descriptor and the hierarchy extension descriptor, it is proposed that only the hierarchy descriptor shall be used, and the hierarchy extension descriptor may be removed.

The use of the hierarchy descriptor in this alternative for the dependency structure as shown in FIG. 5 (possibly FIG. 6 or 7) are as follows:

a. A hierarchy descriptor shall be present for esA to describe that esA is a base layer elementary stream.
b. A hierarchy descriptor shall be present for esB to describe that esB has temporal dependency to esA.
c. A hierarchy descriptor shall be present for esC to describe that esC has layer dependency to esA.
d. A hierarchy descriptor shall be present for esD to describe that esD has temporal dependency to esC.
e. A hierarchy descriptor shall be present for esD to describe that esD has layer dependency to esB.

On the presence of the hierarchy descriptor or the hierarchy extension descriptor or both, the following two options are proposed:

a. Option 1: for each elementary stream containing HEVC coded pictures, at least one descriptor containing dependency information shall be present.
b. Option 2:
  i. The presence of descriptor containing dependency information is mandatory only when a program contains more than one elementary streams of HEVC coded pictures with the same stream type.
  ii. When no descriptor containing dependency information is present in an program, for each elementary stream in the program that contains HEVC coded pictures, the value of hierarchy layer index for each of the elementary stream is derived as follow: the first of the elementary stream is given value 0, the second of the elementary stream is given value 1, the n-th of the elementary stream is given value n−1.

The use of the hierarchy descriptor and hierarchy extension descriptor in the example of the second alternative or additional example for the dependency structure as shown in FIG. 5 (possibly FIG. 6 or 7) does not need either hierarchy descriptor or hierarchy extension descriptor. As each of the elementary streams are of different types, there is no need to signal descriptor for dependency information as it can be inferred as follows:

a. esA is a base layer elementary stream
b. esB has temporal dependency to esA
c. esC has multi-view dependency to esA d. esD has both multi-view dependency to esC and temporal dependency to esB.

Furthermore, the order of those elementary stream in the program map table are as follow: esA, esB, esC and esC.

Lastly, the value of hierarchy_layer_index for each elementary streams is derived as follow: hierarchy_layer_index of esA is equal to 0, hierarchy_layer_index of esB is equal to 1, hierarchy_layer_index of esC is equal to 2 and hierarchy_layer_index of esD is equal to 4

This following are examples for implementations of one or more example techniques described above. The suggested texts to implement the above proposals are provided.

For improved hierarchy extension descriptor, the semantic of extension_dimension_bits is updated as follow. Italicized text represents updates to the MPEG-2 TS standard:

extension_dimension_bits—A 16-bit field indicating the possible enhancement of the associated program element from the base layer resulting from the program element of the layer with nuh_layer_id equal to 0.

The allocation of the bits to enhancement dimensions is as follows in Table Amd7-4.

TABLE Amd7-4

Semantics of extension dimension bits

| Index to bits | Description |
| --- | --- |
| 0 | Multi-view enhancement |
| 1 | Spatial scalability, including SNR |
| 2 | Depth enhancement |
| 3 | AVC base layer |
| 4 | MPEG-2 base layer |
| 5 | *Temporal enhancement* |
| 6~15 | Reserved |

Note that the value of index to bits assigned for temporal enhancement can be any of the reserved values (e.g., 5 to 15).

For improved hierarchy descriptor, the following changes are proposed for implementation of the example for support for auxiliary layer enhancement in hierarchy descriptor. Note that the updated part is gray-highlighted, with [[ ]] indicating deletion:

Clause 2.6.6

Replace Table 2-49 with:

TABLE 2-49

Hierarchy descriptor

| Syntax | No. of bits | Mnemonic |
| --- | --- | --- |
| hierarchy_descriptor ( ) { | | |
|   descriptor_tag | 8 | uimsbf |
|   descriptor_length | 8 | uimsbf |
|   no_view_scalability_flag | 1 | bslbf |
|   no_temporal_scalability_flag | 1 | bslbf |
|   no_spatial_scalability_flag | 1 | bslbf |
|   no_quality_scalability_flag | 1 | bslbf |
|   hierarchy_type | 4 | uimsbf |
|   *no_auxiliary_flag* | *1* | *bslbf* |
|   reserved | 1 [removed: "2"] | bslbf |
|   hierarchy_layer_index | 6 | uimsbf |
|   tref_present_flag | 1 | bslbf |
|   reserved | 1 | bslbf |
|   hierarchy_embedded_layer_index | 6 | uimsbf |
|   reserved | 2 | bslbf |
|   hierarchy_channel | 6 | uimsbf |
| } | | |

Clause 2.6.7

Replace:

temporal_scalability_flag—A 1-bit flag, which when set to '0' indicates that the associated program element enhances the frame rate of the bit-stream resulting from the program element referenced by the hierarchy_embedded_layer_index. The value of '1' for this flag is reserved.

spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bit-stream resulting from the program element referenced by the hierarchy_embedded_layer_index. The value of '1' for this flag is reserved.

hierarchy_type—The hierarchical relation between the associated hierarchy layer and its hierarchy embedded layer is defined in Table 2-50. If scalability applies in more than one dimension, this field shall be set to the value of '8' ("Combined Scalability"), and the flags temporal_scalability_flag, spatial_scalability_flag and quality_scalability_flag shall be set accordingly. For MVC video sub-bitstreams, this field shall be set to the value of '9' ("MVC video sub-bitstream") and the flags temporal_scalability_flag, spatial_scalability_flag and quality_scalability_flag shall be set to '1'. For MVC base view sub-bitstreams, this field shall be set to the value of '15' and the flags temporal_scalability_flag, spatial_scalability_flag and quality_scalability_flag shall be set to '1'. For MVCD video sub-bitstreams, this field shall be set to the value of '9' ("MVCD video sub-bitstream") and the flags temporal_scalability_flag, spatial_scalability_flag and quality_scalability_flag shall be set to '1'. For MVCD base view sub-bitstreams, this field shall be set to the value of '15' and the flags temporal_scalability_flag, spatial_scalability_flag and quality_scalability_flag shall be set to '1'.

with:

no_view_scalability_flag—A 1-bit flag, which when set to '0' indicates that the associated program element enhances the number of views of the bit-stream resulting from the program element referenced by the hierarchy_embedded_layer_index. The value of '1' for this flag is reserved.

no_temporal_scalability_flag—A 1-bit flag, which when set to '0' indicates that the associated program element enhances the frame rate of the bit-stream resulting from the program element referenced by the hierarchy_embedded_layer_index. The value of '1' for this flag is reserved.

no_spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

no_quality_scalability_flag—A 1-bit flag, which when set to '0' indicates that the associated program element enhances the SNR quality or fidelity of the bit-stream resulting from the program element referenced by the hierarchy_embedded_layer_index. The value of '1' for this flag is reserved.

hierarchy_type—The hierarchical relation between the associated hierarchy layer and its hierarchy embedded layer is defined in Table 2-50. If scalability applies in more than one dimension, this field shall be set to the value of '8' ("Combined Scalability"), and the flags no_view_scalability_flag, no_temporal_scalability_flag, no_spatial_scalability_flag and no_quality_scalability_flag shall be set accordingly. For MVC video sub-bitstreams, this field shall be set to the value of '9' ("MVC video sub-bitstream") and the flags no_view_scalability_flag, no_temporal_scalability_flag, no_spatial_scalability_flag and no_quality_scalability_flag shall be set to '1'. For MVC base view sub-bitstreams, this field shall be set to the value of '15' and the flags no_view_scalability_flag, no_temporal_scalability_flag, no_spatial_scalability_flag, no_quality_scalability_flag shall be set to '1' and no_auxiliary_flag shall be set to '1'. For MVCD video sub-bitstreams, this field shall be set to the value of '9' ("MVCD video sub-bitstream") and the flags no_view_scalability_flag, no_temporal_scalability_flag, no_spatial_scalability_flag and no_quality_scalability_flag shall be set to '1'. For MVCD base view sub-bitstreams, this field shall be set to the value of '15' and the flags no_view_scalability_flag, no_temporal_scalability_flag, no_spatial_scalability_flag, no_quality_scalability_flag shall be set to '1' and no_auxiliary_flag shall be set to '1'.

no_auxiliary_flag—A 1-bit flag, which when set to '0' indicates that the associated program element provide auxiliary enhancement resulting from the program element referenced by the hierarchy_embedded_layer_index. The value of '1' for this flag is reserved.

Replace in Table 2-50 the description for value 15 as follows:

TABLE 2-50

Hierarchy_type field values

| Value | Description |
|---|---|
| 10 | Auxiliary |
| 15 | Base layer or MVC base view sub-bitstream or AVC video sub-bitstream of MVC or HEVC temporal video sub-bitstream or HEVC base sub-partition. |

For the proposed use of the hierarchy descriptor and the hierarchy extension descriptor, the following changes are proposed for the implementation of avoiding overlapping use of hierarchy descriptor and hierarchy extension descriptor.

Add at the end of the bulleted list at the section 2.17.1 of L-HEVC TS draft:
 a. One hierarchy descriptor shall be present for each elementary stream with stream_type equal to 0x24 and 0x25.
 b. One hierarchy extension descriptor shall be present for each elementary stream with stream_type equal to 0x27, 0x28, 0x29 and 0x2A.

The following changes are proposed for the implementation of avoiding overlapping.

Add at the end of the bulleted list at the section 2.17.1 of L-HEVC TS draft:
 a. One hierarchy descriptor shall be present for each elementary stream with stream_type equal to 0x24 and 0x25.
 b. For each elementary stream with stream_type equal to 0x27, 0x28, 0x29 and 0x2A, the following applies:
  i. If the elementary stream enhances exactly one other elementary stream, one hierarchy descriptor shall present.
  ii. Otherwise, one hierarchy extension descriptor shall present The second alternative or additional example of the proposed use of the hierarchy descriptor and the hierarchy extension descriptor is now described. The following changes are proposed for the implementation of avoiding overlapping.

Add at the end of the bulleted list at the section 2.17.1 of L-HEVC TS draft:
 a. For elementary stream with stream_type equal to 0x24, one hierarchy descriptor with hierarchy_type equal to 15 shall present.
 b. For each elementary stream with stream_type equal to 0x25, 0x28 and 0x29, one hierarchy descriptor with hierarchy_type equal to 3 shall be present.
 c. For each elementary stream with stream_type equal to 0x27, 0x28, 0x29 and 0x2A, the following applies:
  i. If the elementary stream enhances exactly one other elementary stream, one hierarchy descriptor with hierarchy_type not equal to 3 shall present.
  ii. Otherwise, one hierarchy extension descriptor shall present The third alternative or addition of the proposed use of the hierarchy descriptor and the hierarchy extension descriptor. The following changes are proposed for the implementation of avoiding overlapping.

Add at the end of the bulleted list at the section 2.17.1 of L-HEVC TS draft:
 a. For each elementary stream with stream_type equal to 0x24 and 0x25, one hierarchy descriptor shall present.
 b. For each elementary stream with stream_type equal to 0x27, 0x28, 0x29 or 0x2A, one or more hierarchy descriptors shall present.

Additionally or alternatively, an HEVC video descriptor may be mandatory for each elementary stream with stream_type equal to 0x24 and 0x25. Likewise, when an ITU-T Rec. H.222.0|ISO/IEC 13818-1 program includes one or more elementary streams with stream_type equal to 0x27, 0x28, 0x29 or 0x2A, at least one HEVC operation point descriptor may be mandatory in the program map table associated with the program.

Figure 8:
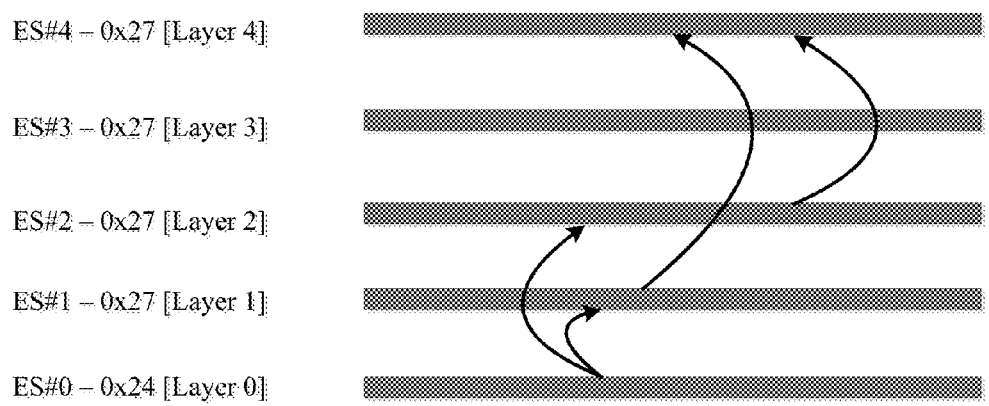
FIG. 8 is a conceptual diagram illustrating an example of multiple layers of video data.

FIG. 8 is a conceptual diagram illustrating an example of multiple layers of video data. An example in which operation point information may be signaled with an HEVC operation point descriptor, e.g., the HEVC operation point descriptor of Proposed Table Amd7-1 as discussed above, is described with respect to the video data of FIG. 8. FIG. 8 represents an example of a program having five layers of a layered HEVC bitstream, partitioned into five elementary streams. The dependency of each elementary stream is as shown in FIG. 8 by arrows between the layers. The dependency may be described by data of a hierarchy extension descriptor, in some examples.

Due to the limited number of bytes a descriptor can have, the signalling of operation points may be split into two HEVC operation point descriptors, as shown below. The first HEVC operation point descriptor, in this example, contains information of the first three PTL structures and the first two operation points, whereas the second HEVC operation point descriptor contains information of the next two PTL structures and the next two operation points.

| First Operation Point Descriptor |
|---|
| #PTL=3 |
| PTL[0]=Main profile, main tier, level 3.1 |
| PTL[1]=MV Main profile, main tier, level 3.1 |
| PTL[2]=MV Main profile, main tier, level 4.1 |

| First Operation Point Descriptor |
| --- |
| #OP = 2<br>es_count[0]=1<br>prepand_dependencies[0]=1<br>es_reference[0][0]=1<br>#layers[0]=2<br>ptl_ref_idx[0][0]=0<br>ptl_ref_idx[0][1]=1<br>es_count[1]=1<br>prepand_dependencies[0]=1<br>es_reference[1][0]=2<br>#layers[1]=3<br>ptl_ref_idx[1][0]=0<br>ptl_ref_idx[1][1]=1<br>ptl_ref_idx[1][2]=2 |

| Second Operation Point Descriptor |
| --- |
| #PTL=1<br>PTL[3]=MV Main profile, main tier, level 5.0<br>#OP = 2<br>es_count[2]=1<br>prepand_dependencies[2]=0<br>es_reference[2][0]=3<br>#layers[2]=1<br>ptl_ref_idx[2][0]=3<br>es_count[3]=2<br>prepand_dependencies[3]=1<br>es_reference[3][0]=4<br>#layers[3]=5<br>ptl_ref_idx[3][0]=0<br>ptl_ref_idx[3][1]=1<br>ptl_ref_idx[3][2]=2<br>ptl_ref_idx[3][3]=0<br>ptl_ref_idx[3][4]=1 |

Note that to save bits, for some operation points the value of prepand_dependencies[opIdx] is set equal to 1 and the list of elementary streams of the operation point can be derived based on dependency information signalled in hierarchy extension descriptor.

Figure 9:
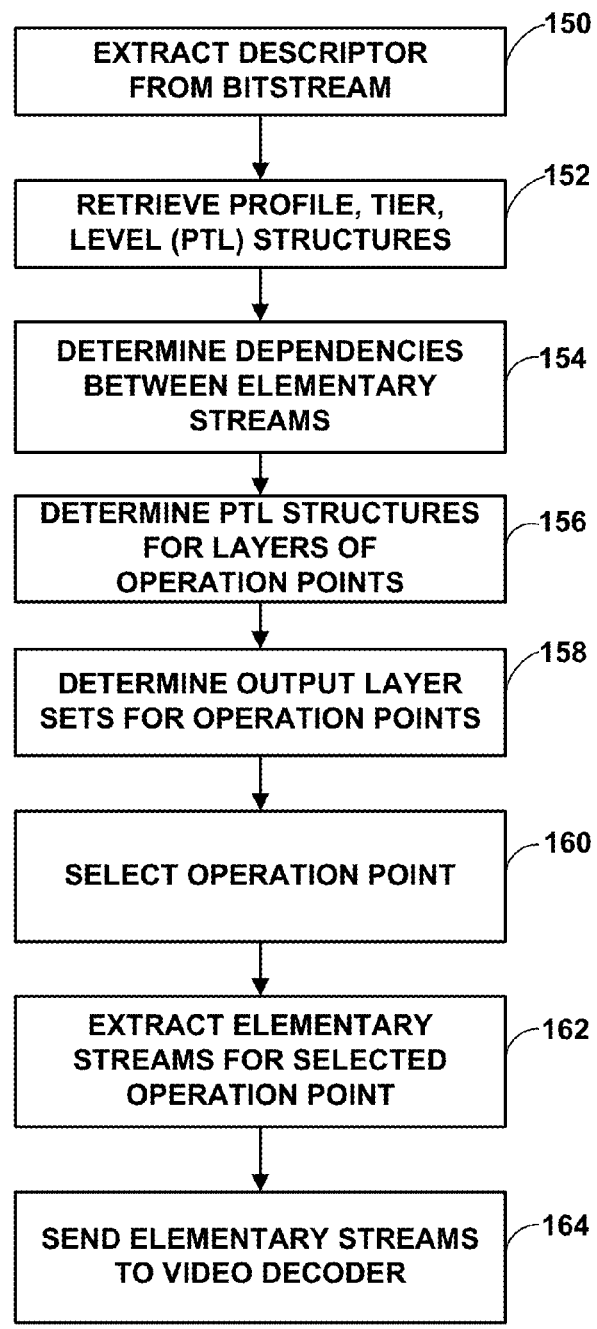
FIG. 9 is a flowchart illustrating an example method in accordance with the techniques of this disclosure.

FIG. 9 is a flowchart illustrating an example method in accordance with the techniques of this disclosure. In this example, the method of FIG. 9 is explained with respect to demultiplexer 29 of FIG. 1. However, it should be understood that other devices may be configured to perform the method of FIG. 9, such as demultiplexer 138 of FIG. 4, or a media aware network element (MANE) positioned between a source device and a destination device. Moreover, a reciprocal method may be performed by a multiplexer, such as multiplexer 21 of FIG. 1 or multiplexer 130 of FIG. 4.

Initially, in this example, demultiplexer 29 extracts a descriptor, such as an HEVC operation point descriptor according to Proposed Table Amd7-1, from a bitstream (150). Demultiplexer 29 then retrieves one or more profile, tier, and level (PTL) structures from the descriptor (152). For example, the PTL structures may correspond to the data of the "for (i=0; i<num_profile_tier_level; i++, ptlIdx++)" loop of Proposed Table Amd7-1 discussed above.

Demultiplexer 29 may determine dependencies between elementary streams (i.e., the layers) (154). The dependencies may be signaled in the HEVC operation point descriptor or in a separate descriptor. For example, demultiplexer 29 may extract a hierarchy descriptor (e.g., according to Table 2-49) or a hierarchy extension descriptor that includes information indicative of the dependencies, as discussed above.

Demultiplexer 29 also determines which of the PTL structures corresponds to each layer of each of a plurality of operation points (156). For example, demultiplexer 29 may determine this correspondence from the "for (j=0; j<num_layers[opIdx]; j++)" loop of Proposed Table Amd7-1 discussed above.

In some examples, demultiplexer 29 may iterate through the PTL structures to determine PTL information of each of the PTL structures, e.g., values for profile_idc[ptlIdx], tier_flag[ptlIdx], and level_idc[ptlIdx]. Demultiplexer 29 may form data structures representative of each of the PTL structures signaled in the descriptor (i.e., each of the PTL structures corresponding to one of the ptlIdx values). Demultiplexer 29 may further retrieve values for PTL reference indexes for each of the layers of each of the operation points that map a corresponding one of the layers to one of the PTL structures to determine the profile, tier, and level information for the corresponding one of the layers. For example, ptl_ref_idx[opIdx][j] of Proposed Table Amd7-1 represents an example of a syntax element having a value that maps layer "j" of operation point "opIdx" to one of the PTL structures.

Furthermore, demultiplexer 29 may determine output layer sets for each of the operation points (158). For example, demultiplexer 29 may determine which of the layers is included in an output layer set for each of the operation points from the target_ols[opIdx] syntax elements of Proposed Table Amd7-1 discussed above. In one example, demultiplexer 29 retrieves values for the target_ols[opIdx] syntax element for each of the operation points from the descriptor, which specify the target output layer sets that are associated with the corresponding operation points.

Based on the information of the descriptor, demultiplexer 29 selects an operation point (160). For example, demultiplexer 29 may determine one of the operation points that can be decoded by video decoder 30. An operation point can be decoded by a video decoder when the video decoder supports the profile, tier, and level elements to which the video data of the operation point corresponds. Thus, if video decoder 30 supports at least the profile, tier, and level of the operation point as indicated by the PTL information from the descriptor, demultiplexer 29 may select the operation point. Demultiplexer 29 may further base the selection on other characteristics, such as a number of target output layers in an output layer set, e.g., as indicated by output layer set information of the descriptor for the operation point. In particular, demultiplexer 29 may determine whether display device 32 can render a number of views equal to the number of target output layers for the operation point. If there are multiple operation points that can be decoded and displayed, demultiplexer 29 may select an operation point with the highest profile, tier, and level that also includes a largest number of views that can be displayed. Additionally or alternatively, demultiplexer 29 may receive input from a user indicative of an operation point to be selected.

In this manner, in one example, demultiplexer 29 may determine one or more profiles of a video coding standard that the video decoder supports, one or more tiers of the video coding standard that the video decoder supports, and one or more levels within the one or more tiers that the video decoder supports, and then select one of the operation points such that each of the layers of the one of the operation points has one of the profiles that the video decoder supports, each of the layers of the one of the operation points has one of the tiers that the video decoder supports, and each of the layers of the one of the operation points has one of the levels that the video decoder supports, as indicated by the PTL structures to which the layers of the one of the operation points correspond.

Demultiplexer 29 may then extract the elementary streams corresponding to the selected operation point (162). The elementary streams to be extracted may include elementary streams including data for each of the target output layer sets, as well as elementary streams including data on which the target output layer sets depends (e.g., for temporal and/or inter-view prediction). Demultiplexer 29 may then send the extracted elementary streams to video decoder 30 (164).

In this manner, the method of FIG. 9 represents an example of a method including extracting a descriptor from the bitstream, wherein the bitstream includes layers of video data for operation points, separate from the descriptor, such that each operation point includes one or more of the layers of video data, and wherein the descriptor includes a set of profile, tier, and level (PTL) structures and data that associates each of the layers of each of the operation points with a corresponding one of the PTL structures, extracting video data for one of the operation points from the bitstream based at least in part on the PTL structures to which the layers of the one of the operation points correspond, and providing the extracted video data to a video decoder.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of processing a bitstream including video data, the method comprising:
   extracting a descriptor from the bitstream, wherein the bitstream includes a plurality of layers of video data for operation points and parameter sets, separate from the descriptor, such that each operation point includes one or more of the layers of video data, wherein the descriptor includes information for the operation points, the information including an associated output layer set for the operation points, and wherein extracting the descriptor includes:
   extracting a plurality of profile, tier, and level (PTL) structures; and
   extracting data that associates each of the layers of each of the operation points with a corresponding one of the PTL structures, wherein the data that associates each of the layers with the corresponding one of the PTL structures is separate from the PTL structures in the descriptor;
   extracting video data for one of the operation points from the bitstream based at least in part on the PTL structures to which the layers of the one of the operation points correspond, wherein extracting the video data comprises:
   determining an output layer set for the one of the operation points based on data of the descriptor;

extracting each layer of the output layer set from the bitstream; and extracting layers on which the layers of the output layer set depend from the bitstream; and providing the extracted video data to a video decoder.

2. The method of claim 1, wherein extracting the video data comprises:

determining one or more profiles of a video coding standard that the video decoder supports, one or more tiers of the video coding standard that the video decoder supports, and one or more levels within the one or more tiers that the video decoder supports; and selecting the one of the operation points such that each of the layers of the selected one of the operation points has one of the profiles that the video decoder supports, each of the layers of the selected one of the operation points has one of the tiers that the video decoder supports, and each of the layers of the selected one of the operation points has one of the levels that the video decoder supports, as indicated by the PTL structures to which the layers of the one of the operation points correspond.

3. The method of claim 1, further comprising:

iterating through the PTL structures to determine at least profile information, tier information, and level information for each of the PTL structures; and for each of the layers of each of the operation points, retrieving, from the descriptor, values for PTL reference indexes that map a corresponding one of the layers to one of the PTL structures to determine the profile, tier, and level information for the corresponding one of the layers.

4. The method of claim 1, wherein each of the PTL structures includes data representative of a general_profile_space value, a general_tier_flag value, a plurality of general_profile_idc values, a general_profile_compatibility_flag [i] value for the i$^{th}$ general_profile_idc value, a general_progressive_source_flag value, a general_interlaced_source_flag value, a general_non_ packed_constraint_flag value, a general_frame_only_constraint_flag value, a general_reserved_zero_44 bits value, and a level_idc value.

5. The method of claim 1, wherein the descriptor further includes information for, an associated partitioning scheme for the operation points, a highest temporal sub-layer for the corresponding operation points, a list of elementary streams that make up the operation points, the number of output layers for the corresponding operation points, a mapping of layers contained in each elementary stream of the operation point to the PTL structures, and frame rate information for the operation points.

6. The method of claim 1, wherein determining the output layer set comprises retrieving, from the descriptor, values for target output layer set syntax elements for each of the operation points, wherein the target output layer set syntax elements specify the target output layer sets associated with the operation points.

7. The method of claim 1, wherein determining the output layer set comprises retrieving, from the descriptor, values for flags for each of the layers, wherein the flags indicate whether the corresponding layer is an output layer.

8. The method of claim 1, further comprising extracting information indicating one or more reference elementary streams for at least one elementary stream from the bitstream.

9. The method of claim 8, wherein the video data of the one or more reference elementary streams comprises video data at a first set of one or more temporal layers, and wherein the video data of the at least one elementary stream comprises video data of a temporal layer that is higher than the temporal layers of the first set.

10. The method of claim 9, further comprising processing values for bits of an extension dimension bits syntax element, wherein at least one bit of the extension dimension bits syntax element has a value indicating that the video data of the at least one elementary stream represents temporal enhancement.

11. The method of claim 9, further comprising processing a value for a hierarchy_type syntax element of the descriptor, wherein the value indicates that a type for enhancement between the video data of the current elementary stream and the one or more reference elementary streams is an auxiliary type.

12. The method of claim 1, wherein extracting the descriptor comprises extracting a plurality of descriptors from the bitstream, each of the descriptors being consecutive in the bitstream and including respective sets of PTL structures and data that associates each of the layers of each of the operation points with a corresponding one of the PTL structures.

13. The method of claim 1, wherein the descriptor comprises a program level descriptor.

14. The method of claim 1, wherein the descriptor comprises an elementary stream level descriptor.

15. The method of claim 1, wherein extracting the descriptor comprises extracting a group of descriptors that immediately follows a program_info_length field of a program map table of the bitstream.

16. The method of claim 1, wherein extracting the descriptor comprises extracting a group of descriptors that immediately follows an ES_info_length field of a program map table of the bitstream.

17. The method of claim 1, further comprising determining whether the descriptor is included in the bitstream based on stream types for one or more elementary streams of a program of the bitstream.

18. The method of claim 1, further comprising determining that the descriptor is included in the bitstream when a stream type for at least one elementary stream of a program of the bitstream has a value of 0x27, 0x28, 0x29, or 0x2A.

19. A device for processing a bitstream including video data, the device comprising:

a memory to store data extracted from the bitstream; and one or more processing units configured to:

extract a descriptor from the bitstream, wherein the bitstream includes a plurality of layers of video data for operation points and parameter sets, separate from the descriptor, such that each operation point includes one or more of the layers of video data, wherein the descriptor includes information for the operation points, the information including an associated output layer set for the operation points, and wherein to extract the descriptor, the one or more processing units are configured to:

extract a plurality of profile, tier, and level (PTL) structures; and extract data that associates each of the layers of each of the operation points with a corresponding one of the PTL structures, wherein the data that associates each of the layers with the corresponding one of the PTL structures is separate from the PTL structures in the descriptor;

extract video data for one of the operation points from the bitstream based at least in part on the PTL structures to which the layers of the one of the operation points correspond, wherein to extract the video data, the one or more processing units are configured to:
determine an output layer set for the one of the operation points based on data of the descriptor;
extract each layer of the output layer set from the bitstream; and
extract layers on which the layers of the output layer set depend from the bitstream, and provide the extracted video data to a video decoder.

20. The device of claim 19, wherein the one or more processing units are further configured to:
determine one or more profiles of a video coding standard that the video decoder supports, one or more tiers of the video coding standard that the video decoder supports, and one or more levels within the one or more tiers that the video decoder supports; and
select the one of the operation points such that each of the layers of the one of the operation points has one of the profiles that the video decoder supports, each of the layers of the one of the operation points has one of the tiers that the video decoder supports, and each of the layers of the one of the operation points has one of the levels that the video decoder supports, as indicated by the PTL structures to which the layers of the one of the operation points correspond.

21. The device of claim 19, wherein the one or more processing units are further configured to:
iterate through the PTL structures to determine at least profile information, tier information, and level information for each of the PTL structures; and
for each of the layers of each of the operation points, retrieve, from the descriptor, values for PTL reference indexes that map a corresponding one of the layers to one of the PTL structures to determine the profile, tier, and level information for the corresponding one of the layers.

22. The device of claim 19, wherein the descriptor further includes information for, an associated partitioning scheme for the operation points, a highest temporal sub-layer for the operation points, a list of elementary streams that make up the operation points, the number of output layers for the corresponding operation points, a mapping of layers contained in each elementary stream of the operation points to the PTL structures, and frame rate information for the operation points.

23. The device of claim 19, wherein to determine the output layer sets, the one or more processors are configured to retrieve, from the descriptor, values for target output layer set syntax elements for each of the operation points, wherein the target output layer set syntax elements specify the target output layer sets associated with the operation points.

24. The device of claim 19, wherein to determine the output layer sets, the one or more processors are configured to retrieve, from the descriptor, values for flags for each of the layers, wherein the flags indicate whether the corresponding layer is an output layer.

25. The device of claim 19, wherein the one or more processing units are further configured to extract information indicating one or more reference elementary streams for at least one elementary stream from the bitstream.

26. The device of claim 19, wherein the one or more processing units are configured to extract a plurality of descriptors from the bitstream, each of the descriptors being consecutive in the bitstream and including respective sets of PTL structures and data that associates each of the layers of each of the operation points with a corresponding one of the PTL structures.

27. The device of claim 19, wherein the descriptor comprises a program level descriptor.

28. The device of claim 19, wherein the descriptor comprises an elementary stream level descriptor.

29. The device of claim 19, wherein the one or more processing units are configured to extract a group of descriptors that immediately follows a program_info_length field of a program map table of the bitstream.

30. The device of claim 19, wherein the one or more processing units are configured to extract a group of descriptors that immediately follows an ES_info_length field of a program map table of the bitstream.

31. The device of claim 19, wherein the one or more processing units are configured to determine whether the descriptor is included in the bitstream based on stream types for one or more elementary streams of a program of the bitstream.

32. The device of claim 19, wherein the one or more processing units are configured to determine that the descriptor is included in the bitstream when a stream type for at least one elementary stream of a program of the bitstream has a value of 0x27, 0x28, 0x29, or 0x2A.

33. A device for processing video data, the device comprising:
means for extracting a descriptor from the bitstream, wherein the bitstream includes a plurality of layers of video data for operation points and parameter sets, separate from the descriptor, such that each operation point includes one or more of the layers of video data, wherein the descriptor includes information for the operation points, the information including an associated output layer set for the operation points, and wherein the means for extracting the descriptor includes:
means for extracting a plurality of profile, tier, and level (PTL) structures; and
means for extracting data that associates each of the layers of each of the operation points with a corresponding one of the PTL structures, wherein the data that associates each of the layers with the corresponding one of the PTL structures is separate from the PTL structures in the descriptor;
means for extracting video data for one of the operation points from the bitstream based at least in part on the PTL structures to which the layers of the one of the operation points correspond; and
means for providing the extracted video data to a video decoder.

34. The device of claim 33, wherein the means for extracting the video data comprises:
means for determining one or more profiles of a video coding standard that the video decoder supports, one or more tiers of the video coding standard that the video decoder supports, and one or more levels within the one or more tiers that the video decoder supports; and
means for selecting the one of the operation points such that each of the layers of the one of the operation points has one of the profiles that the video decoder supports, each of the layers of the one of the operation points has one of the tiers that the video decoder supports, and each of the layers of the one of the operation points has one of the levels that the video decoder supports, as indicated by the PTL structures to which the layers of the one of the operation points correspond.

35. The device of claim 33, further comprising:
iterating through the PTL structures to determine at least profile information, tier information, and level information for each of the PTL structures; and
means for retrieving from the descriptor, for each of the layers of each of the operation points, values for PTL reference indexes that map a corresponding one of the layers to one of the PTL structures to determine the profile, tier, and level information for the corresponding one of the layers.

36. The device of claim 33, wherein the descriptor further includes information for an associated partitioning scheme for the operation points, a highest temporal sub-layer for the operation points, a list of elementary streams that make up the operation points, the number of output layers for the corresponding operation points, a mapping of layers contained in each elementary stream of the operation points to the PTL structures, and frame rate information for the operation points.

37. The device of claim 33, wherein the means for extracting the video data comprises:
means for determining an output layer set for the one of the operation points based on data of the descriptor;
means for extracting each layer of the output layer set from the bitstream; and
means for extracting layers on which the layers of the output layer set depend from the bitstream.

38. The device of claim 33, wherein the means for determining the output layer set comprises means for retrieving, from the descriptor, values for target output layer set syntax elements for each of the operation points, wherein the target output layer set syntax elements specify the target output layer sets associated with the corresponding operation points.

39. The device of claim 38, wherein the means for determining the output layer set comprises means for retrieving, from the descriptor, values for flags for each of the layers, wherein the flags indicate whether the corresponding layer is an output layer.

40. The device of claim 33, further comprising means for extracting information indicating one or more reference elementary streams for at least one elementary stream from the bitstream.

41. The device of claim 33, wherein the means for extracting the descriptor comprises means for extracting a plurality of descriptors from the bitstream, each of the descriptors being consecutive in the bitstream and including respective sets of PTL structures and data that associates each of the layers of each of the operation points with a corresponding one of the PTL structures.

42. The device of claim 33, wherein the means for extracting the descriptor comprises extracting a group of descriptors that immediately follows a program_info_length field of a program map table of the bitstream.

43. The device of claim 33, wherein the means for extracting the descriptor comprises means for extracting a group of descriptors that immediately follows an ES_info_length field of a program map table of the bitstream.

44. The device of claim 33, further comprising means for determining whether the descriptor is included in the bitstream based on stream types for one or more elementary streams of a program of the bitstream.

45. The device of claim 33, further comprising means for determining that the descriptor is included in the bitstream when a stream type for at least one elementary stream of a program of the bitstream has a value of 0x27, 0x28, 0x29, or 0x2A.

46. A non-transitory computer-readable storage medium having stored thereon instructions that, when executed, cause a processor to:
extract a descriptor from a bitstream including video data, wherein the bitstream includes a plurality of layers of video data for operation points and parameter sets, separate from the descriptor, such that each operation point includes one or more of the layers of video data, wherein the descriptor includes information for the operation points, the information including an associated output layer set for the operation points, and wherein the instructions that cause the processor to extract the descriptor comprise instructions that cause the processor to:
extract a plurality of profile, tier, and level (PTL) structures; and
extract data that associates each of the layers of each of the operation points with a corresponding one of the PTL structures, wherein the data that associates each of the layers with the corresponding one of the PTL structures is separate from the PTL structures in the descriptor;
extract video data for one of the operation points from the bitstream based at least in part on the PTL structures to which the layers of the one of the operation points correspond; and
provide the extracted video data to a video decoder.

47. The non-transitory computer-readable storage medium of claim 46, wherein the instructions that cause the processor to extract the video data comprise instructions that cause the processor to:
determine one or more profiles of a video coding standard that the video decoder supports, one or more tiers of the video coding standard that the video decoder supports, and one or more levels within the one or more tiers that the video decoder supports; and
select the one of the operation points such that each of the layers of the one of the operation points has one of the profiles that the video decoder supports, each of the layers of the one of the operation points has one of the tiers that the video decoder supports, and each of the layers of the one of the operation points has one of the levels that the video decoder supports, as indicated by the PTL structures to which the layers of the one of the operation points correspond.

48. The non-transitory computer-readable storage medium of claim 46, further comprising instructions that cause the processor to:
iterate through the PTL structures to determine at least profile information, tier information, and level information for each of the PTL structures; and
for each of the layers of each of the operation points, retrieve, from the descriptor, values for PTL reference indexes that map a corresponding one of the layers to one of the PTL structures to determine the profile, tier, and level information for the corresponding one of the layers.

49. The non-transitory computer-readable storage medium of claim 46, wherein the descriptor further includes information for, an associated partitioning scheme for the operation points, a highest temporal sub-layer for the operation points, a list of elementary streams that make up the operation points, the number of output layers for the operation points, a mapping of layers contained in each elementary stream of the operation points to the PTL structures, and frame rate information for the operation points.

50. The non-transitory computer-readable storage medium of claim 46, wherein the instructions that cause the processor to extract the video data comprise instructions that cause the processor to:
- determine an output layer set for the one of the operation points based on data of the descriptor;
- extract each layer of the output layer set from the bitstream; and
- extract layers on which the layers of the output layer set depend from the bitstream.

51. The non-transitory computer-readable storage medium of claim 50, wherein the instructions that cause the processor to determine the output layer set comprise instructions that cause the processor to retrieve, from the descriptor, values for target output layer set syntax elements for each of the operation points, wherein the target output layer set syntax elements specify the target output layer sets associated with the corresponding operation points.

52. The non-transitory computer-readable storage medium of claim 50, wherein the instructions that cause the processor to determine the output layer set comprise instructions that cause the processor to retrieve, from the descriptor, values for flags for each of the layers, wherein the flags indicate whether the corresponding layer is an output layer.

53. The non-transitory computer-readable storage medium of claim 46, further comprising instructions that cause the processor to extract information indicating one or more reference elementary streams for at least one elementary stream from the bitstream.

54. The non-transitory computer-readable storage medium of claim 46, wherein the instructions that cause the processor to extract the descriptor comprise instructions that cause the processor to extract a plurality of descriptors from the bitstream, each of the descriptors being consecutive in the bitstream and including respective sets of PTL structures and data that associates each of the layers of each of the operation points with a corresponding one of the PTL structures.

55. The non-transitory computer-readable storage medium of claim 46, wherein the instructions that cause the processor to extract the descriptor comprise instructions that cause the processor to extract a group of descriptors that immediately follows a program_info_length field of a program map table of the bitstream.

56. The non-transitory computer-readable storage medium of claim 46, wherein the instructions that cause the processor to extract the descriptor comprise instructions that cause the processor to extract a group of descriptors that immediately follows an ES_info_length field of a program map table of the bitstream.

57. The non-transitory computer-readable storage medium of claim 46, further comprising instructions that cause the processor to determine whether the descriptor is included in the bitstream based on stream types for one or more elementary streams of a program of the bitstream.

58. The non-transitory computer-readable storage medium of claim 46, further comprising instructions that cause the processor to determine that the descriptor is included in the bitstream when a stream type for at least one elementary stream of a program of the bitstream has a value 0x27, 0x28, 0x29, or 0x2A.

* * * * *